United States Patent [19]

Hirata et al.

[11] Patent Number: 5,949,963
[45] Date of Patent: Sep. 7, 1999

[54] IMAGE FORMATION APPARATUS EXPOSING PHOTOCONDUCTOR ACCORDING TO IMAGE DENSITY DATA TO FORM IMAGE THEREON

[75] Inventors: Katsuyuki Hirata; Kentaro Katori, both of Toyokawa; Yoshinobu Hada, Aichi-Ken; Hironobu Nakata; Yoshihiko Hirota, both of Toyokawa, all of Japan

[73] Assignee: Minolta Co., Ltd., Osaka, Japan

[21] Appl. No.: 08/814,920

[22] Filed: Mar. 12, 1997

[30] Foreign Application Priority Data

Mar. 13, 1996 [JP] Japan ................................. 8-055921

[51] Int. Cl.[6] .............................. B41B 15/00; B41J 2/385; H04N 1/40
[52] U.S. Cl. ......................... 395/109; 358/455; 358/471; 347/131; 347/254
[58] Field of Search ..................................... 358/296, 475, 358/468, 519, 534, 448, 298, 455, 471, 456, 458, 459, 469, 300, 521; 395/101, 109; 399/51, 52; 347/131, 251, 254, 132; 355/35

[56] References Cited

U.S. PATENT DOCUMENTS 4,816,863  3/1989  Lee .......................................... 347/129
5,189,441  2/1993  Fukui et al. .

*Primary Examiner*—Kim Yen Vu
*Assistant Examiner*—Kimberly A. Williams
*Attorney, Agent, or Firm*—Burns, Doane, Swecker & Mathis, LLP

[57] ABSTRACT

In a digital full color copying machine, one pixel on a photoconductor is divided into four subdivided small pixels. Functions a–d are assigned to each subdivided small pixel. Functions a–d are linear functions with density data as a parameter. The slope of functions a–d becomes smaller in sequential order. Exposure data of the four subdivided small pixels is calculated according to the density data of a pixel and functions a–d to expose each subdivided small pixel. A peak can be established in the exposure amount distribution to form a deeper latent image. Accordingly, resolution and graininess of the halftone area are improved.

13 Claims, 38 Drawing Sheets

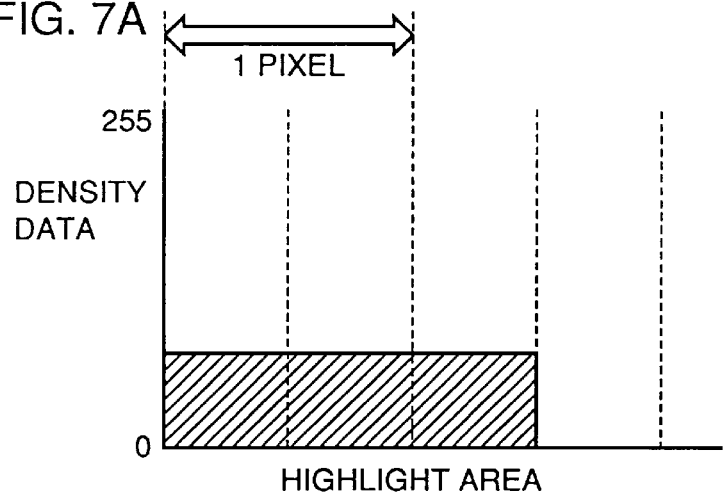
FIG. 7A HIGHLIGHT AREA
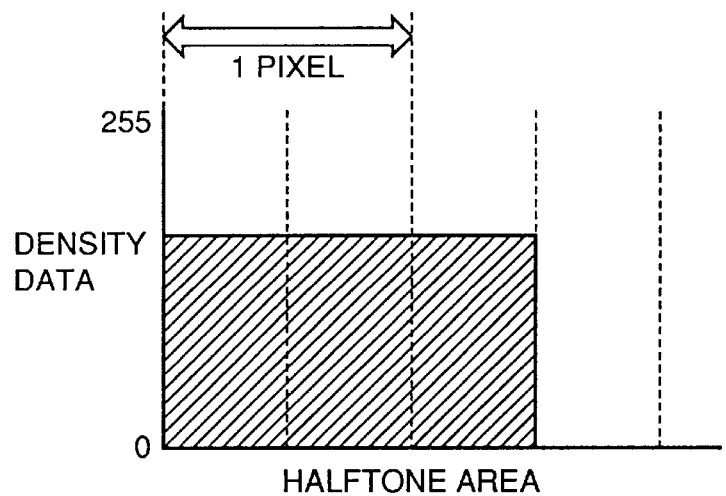
FIG. 7B HALFTONE AREA
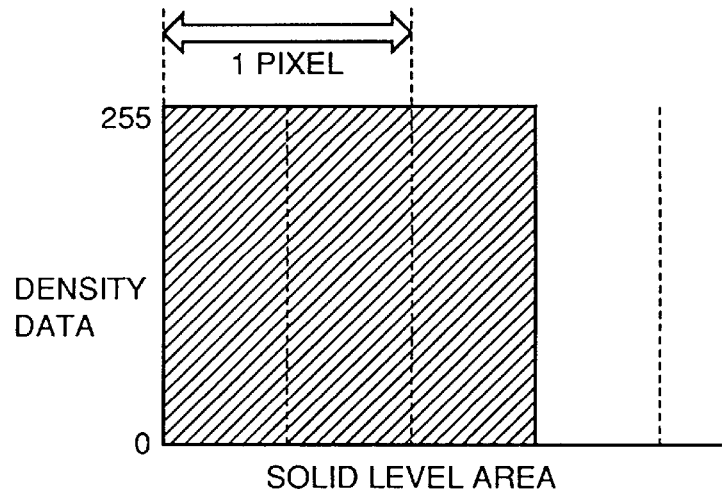
FIG. 7C SOLID LEVEL AREA

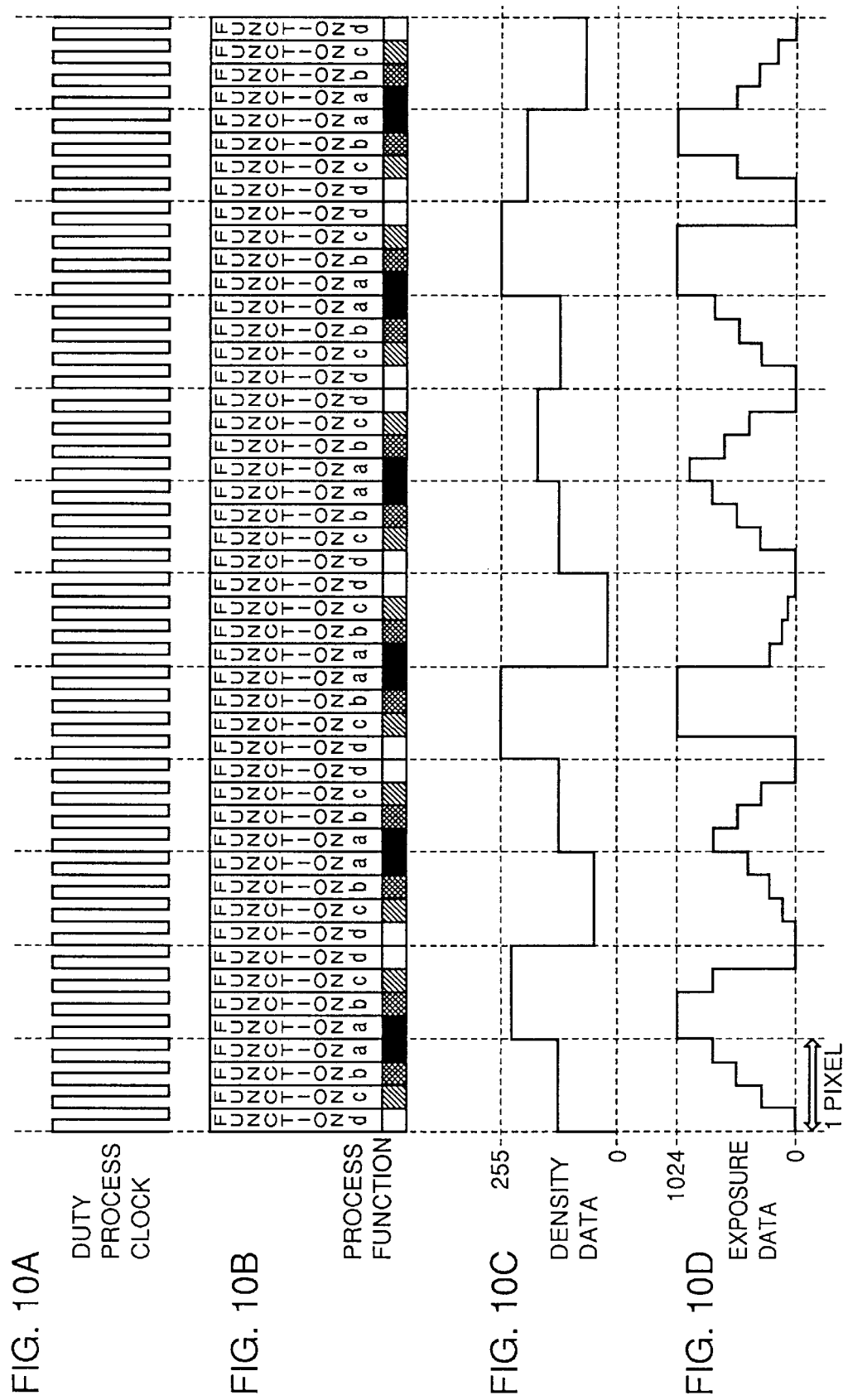

| EXPOSURE STEP (STP) | EXPOSURE LEVEL |
|---|---|
| 1 | 32 |
| 2 | 48 |
| 3 | 64 |
| 4 | 80 |
| 5 | 96 |
| 6 | 112 |
| 7 | 128 |
| 8 | 144 |
| 9 | 160 |
| 10 | 192 |
| 11 | 224 |
| 12 | 255 |

FIG. 41

| AMOUNT OF TONER TRANSFERRED | AMOUNT OF RESIDUAL TONER ON PC (R) (mg/cm$^2$) |
|---|---|
| 0 | 0 |
| $\frac{1.0}{255} \times 1$ | 0.003 |
| $\frac{1.0}{255} \times 2$ | 0.006 |
| ⋮ | ⋮ |
| $\frac{1.0}{255} \times 128$ | 0.08 |
| ⋮ | ⋮ |
| $\frac{1.0}{255} \times 255$ | 0.1 |

FIG. 42

| ABSOLUTE HUMIDITY | COEFFICIENT ($d_1$) |
|---|---|
| ~10 | 1.05 |
| ~15 | 1.02 |
| ~20 | 1.0 |
| ~25 | 0.98 |
| 25~ | 0.95 |

| KIND OF SHEET | COEFFICIENT (d2) |
|---|---|
| THICK | 1.05 |
| STANDARD | 1.0 |
| THIN | 0.95 |

| NUMBER OF COPIES TO BE MADE BY MACHINE | COEFFICIENT (d3) |
|---|---|
| ~10$^K$ | 1.0 |
| ~20$^K$ | 0.95 |
| ~30$^K$ | 0.90 |

FIG. 52A

⟨CYAN⟩ ⟨ODD NUMBERED LINE⟩

| FUNCTION d | FUNCTION c | FUNCTION b | FUNCTION a | FUNCTION a | FUNCTION b | FUNCTION c | FUNCTION d |

FIG. 52B

⟨EVEN NUMBERED LINE⟩

| FUNCTION a | FUNCTION b | FUNCTION c | FUNCTION d | FUNCTION d | FUNCTION c | FUNCTION b | FUNCTION a |

FIG. 52C

⟨MAGENTA⟩

| FUNCTION d | FUNCTION c | FUNCTION b | FUNCTION a | FUNCTION a | FUNCTION b | FUNCTION c | FUNCTION d |

FIG. 52D

| FUNCTION a | FUNCTION b | FUNCTION c | FUNCTION d | FUNCTION d | FUNCTION c | FUNCTION b | FUNCTION a |

FIG. 52E

⟨YELLOW⟩

| FUNCTION d | FUNCTION c | FUNCTION b | FUNCTION a | FUNCTION a | FUNCTION b | FUNCTION c | FUNCTION d |

FIG. 52F

| FUNCTION a | FUNCTION b | FUNCTION c | FUNCTION d | FUNCTION d | FUNCTION c | FUNCTION b | FUNCTION a |

FIG. 52G

⟨BLACK⟩

| FUNCTION a | FUNCTION b | FUNCTION c | FUNCTION d | FUNCTION d | FUNCTION c | FUNCTION b | FUNCTION a |

FIG. 52H

| FUNCTION d | FUNCTION c | FUNCTION b | FUNCTION a | FUNCTION a | FUNCTION b | FUNCTION c | FUNCTION d |

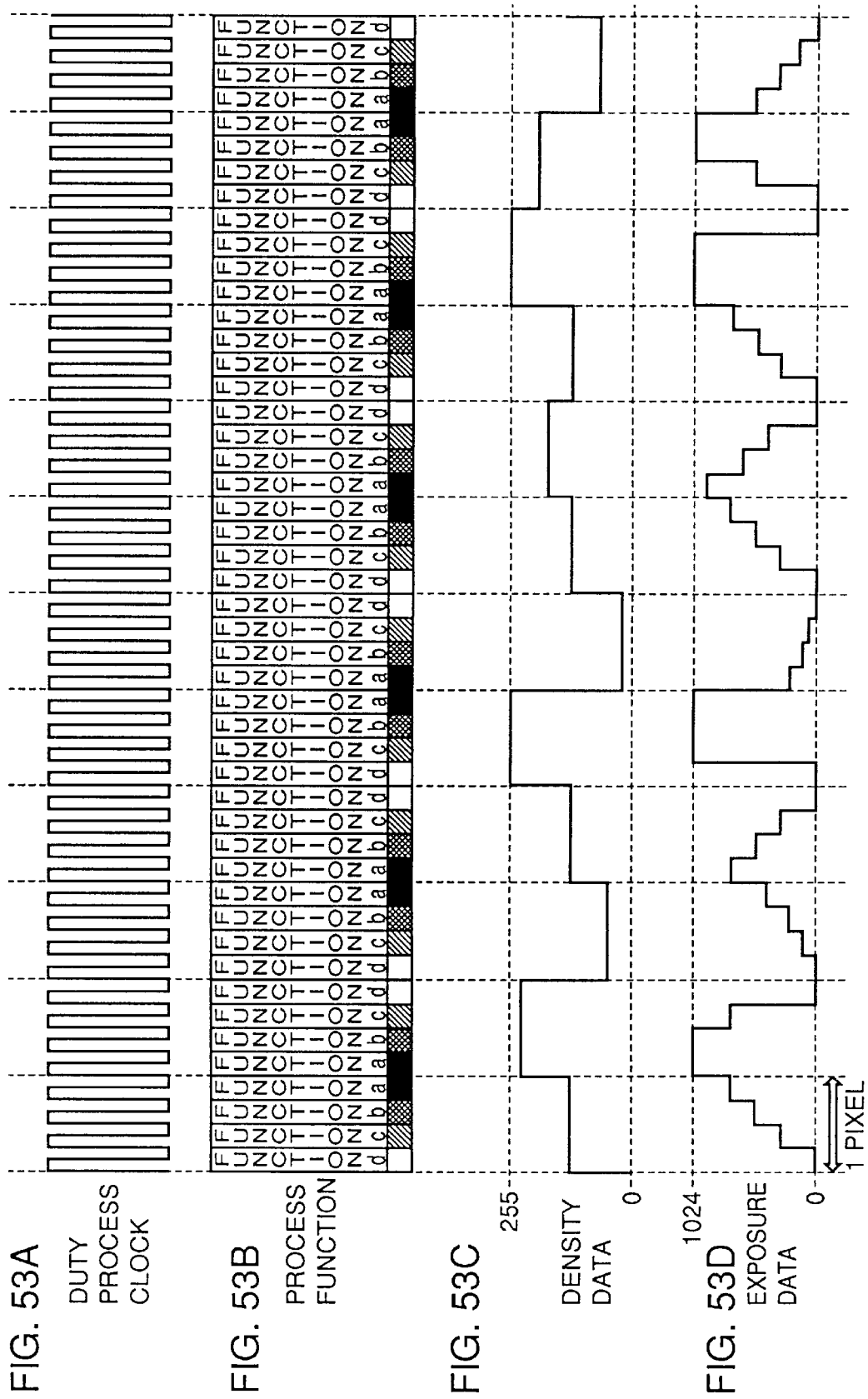

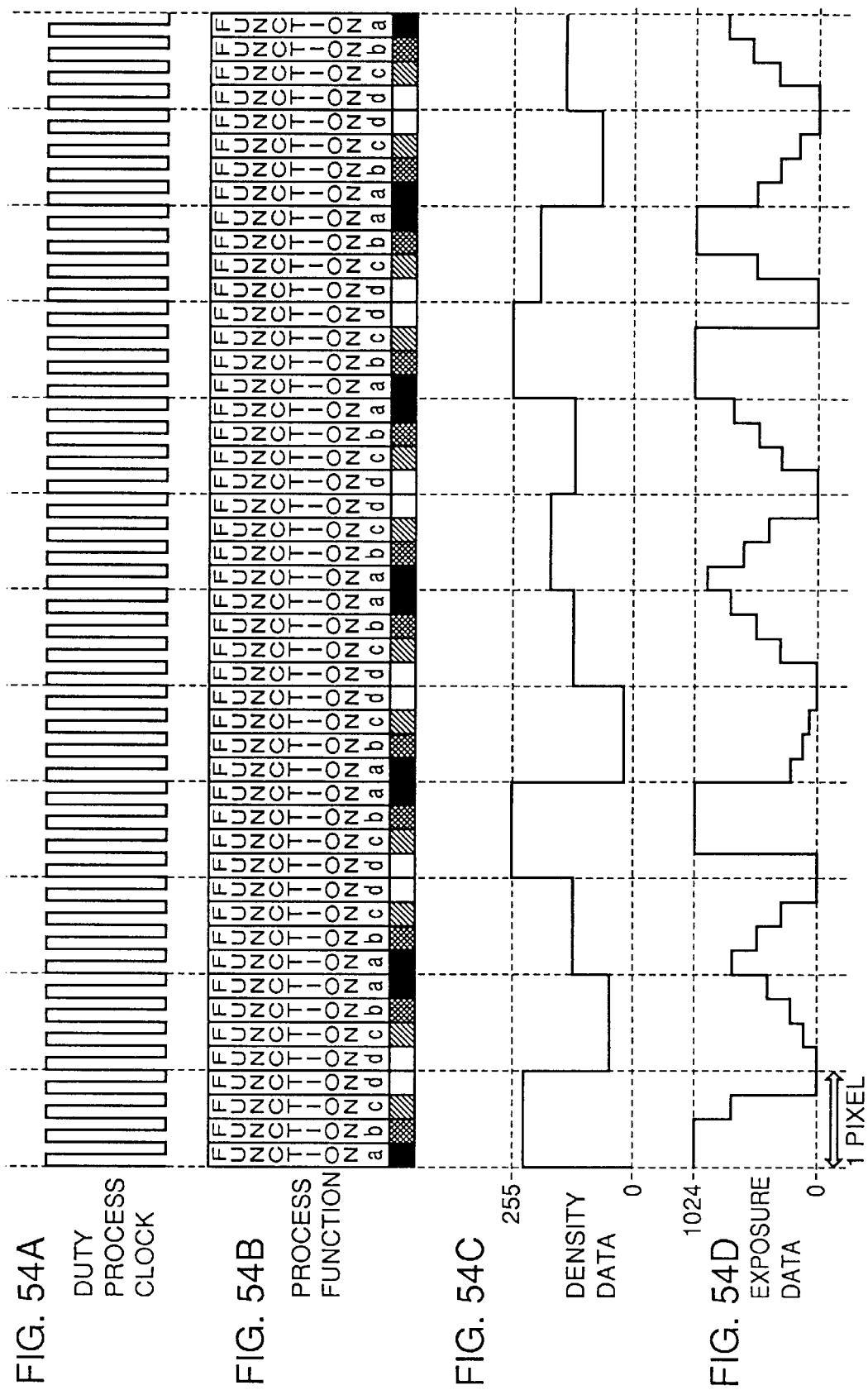

IMAGE FORMATION APPARATUS EXPOSING PHOTOCONDUCTOR ACCORDING TO IMAGE DENSITY DATA TO FORM IMAGE THEREON

BACKGROUND OF THE INVENTION

1. Field of the Invention

The present invention relates to image formation apparatuses. More particularly, the present invention relates to an image formation apparatus such as a digital copying machine, a printer, and the like to form an image on a photoconductor by exposing the photoconductor according to image density data of each pixel in an original.

2. Description of the Related Art

In an image formation apparatus such as a digital copying machine, an intensity modulation method is known as a conventional method of forming an image on a photoconductor. The intensity of a light beam directed onto a photoconductor is modulated according to image density data of each pixel in the original. This method is advantageous in that high resolution and fine smooth gradation characteristics can be achieved since an image is obtained with the density associated with the read out image density data in a one-to-one correspondence.

In a conventional intensity modulation method, critical control of the density is required in the highlight area. It was not easy to stabilize the tone reproduction. Furthermore, there is a possibility of the graininess of the halftone area being degraded due to generation of random noise. The inventors of the present invention aimed to improve stabilization of tone reproduction and graininess by reducing the duty ratio of the light emission time less than 100% in the intensity modulation method (U.S. Pat. No. 5,189,441). However, a phenomenon was seen of degradation in the resolution due to the fine lines on the image in this method.

SUMMARY OF THE INVENTION

In view of the foregoing, an object of the present invention is to provide an image formation apparatus that has a high resolution, favorable graininess in the halftone area and tone reproduction in the highlight area with less image noise such as pitch unevenness.

According to an aspect of an image formation apparatus of the present invention, each pixel region is divided into 1 to N small pixel regions. An exposure calculation unit calculates the amount of exposure of each small pixel region according to first to Nth functions and image density data. A peak can be established in the exposure amount distribution of each pixel region to result in formation of a deeper latent image. Accordingly, the graininess of the halftone area and the tone reproduction of the highlight portion are improved. Also, image noise such as unevenness in pitch is reduced.

Preferably, the first to Nth functions are linear functions differing in at least one of the slope and the intercept. Accordingly, calculation of the amount of exposure is simplified.

Further preferably, the exposure amount calculation unit calculates the amount of exposure of the first to Nth small pixel regions corresponding to one of two pixels adjacent to each other in the original according to image density data of that one of the two pixels and the first to Nth functions, and calculates the amount of exposure of the first to Nth small pixel regions corresponding to the other of the two pixels according to image density data of that other pixel and Nth to first functions. In this case, a peak in the exposure amount distribution can be established between each two adjacent pixels.

More preferably, when image density data is data of a predetermined color, the exposure amount calculation unit calculates the amount of exposure of first to Nth small pixel regions corresponding to the one pixel according to image density data of the one pixel and the N to first functions, and calculates the amount of the exposure of the first to Nth small pixel regions corresponding to the other one pixel according to image density data of that other pixel and first to Nth functions. In this case, color moire can be prevented in color image formation.

Also preferably, a data calculation unit is provided for calculating the relationship between image density data and the amount of exposure of a pixel region corresponding to one pixel of the photoconductor according to first to Nth functions to calculate $\gamma$ correction data according to the calculated result and the set image forming parameter. Image density data is corrected according to the obtained $\gamma$ correction data. Thus, favorable gradation characteristic can be constantly obtained without using a memory of a large capacity.

According to another aspect of an image formation apparatus of the present invention, each pixel region is divided into a plurality of small pixel regions. An exposure calculation unit calculates the amount of exposure of each small pixel region according to one of a plurality of functions and image density data. Here, the amount of exposure of each small pixel region is calculated according to a function differing from the function used in calculating the amount of exposure of an adjacent small pixel region, and image density data. Therefore, a peak can be established in the exposure amount distribution of each pixel region to result in formation of a deeper latent image. The graininess of the halftone area and the tone reproduction of the high light portion are improved. Also, image noise such as unevenness in pitch is reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A–7C show comparative examples of image data.

FIGS. 10A–10D show the correspondence among a duty process clock, function arrangement parameter, input image data, and processed image data.

FIG. 29 shows sensitivity characteristic of a photoconductor when power is turned on.

FIG. 41 shows the relationship between the amount of toner transferred to a transfer sheet and the amount of residual toner remaining on the photoconductor.

FIG. 42 shows a transfer efficiency coefficient with respect to absolute humidity.

FIGS. 52A–52H show function arrangement parameters of a digital copying machine according to a second embodiment of the present invention.

FIGS. 53A–53D show the correspondence of duty process clock, function arrangement parameter, input image data, and processed image data for an odd numbered line.

FIGS. 54A–54D show the correspondence of duty process clock, function arrangement parameter, input image data, and processed image data for an even numbered line.

DESCRIPTION OF THE PREFERRED EMBODIMENTS

First Embodiment

Figure 1:
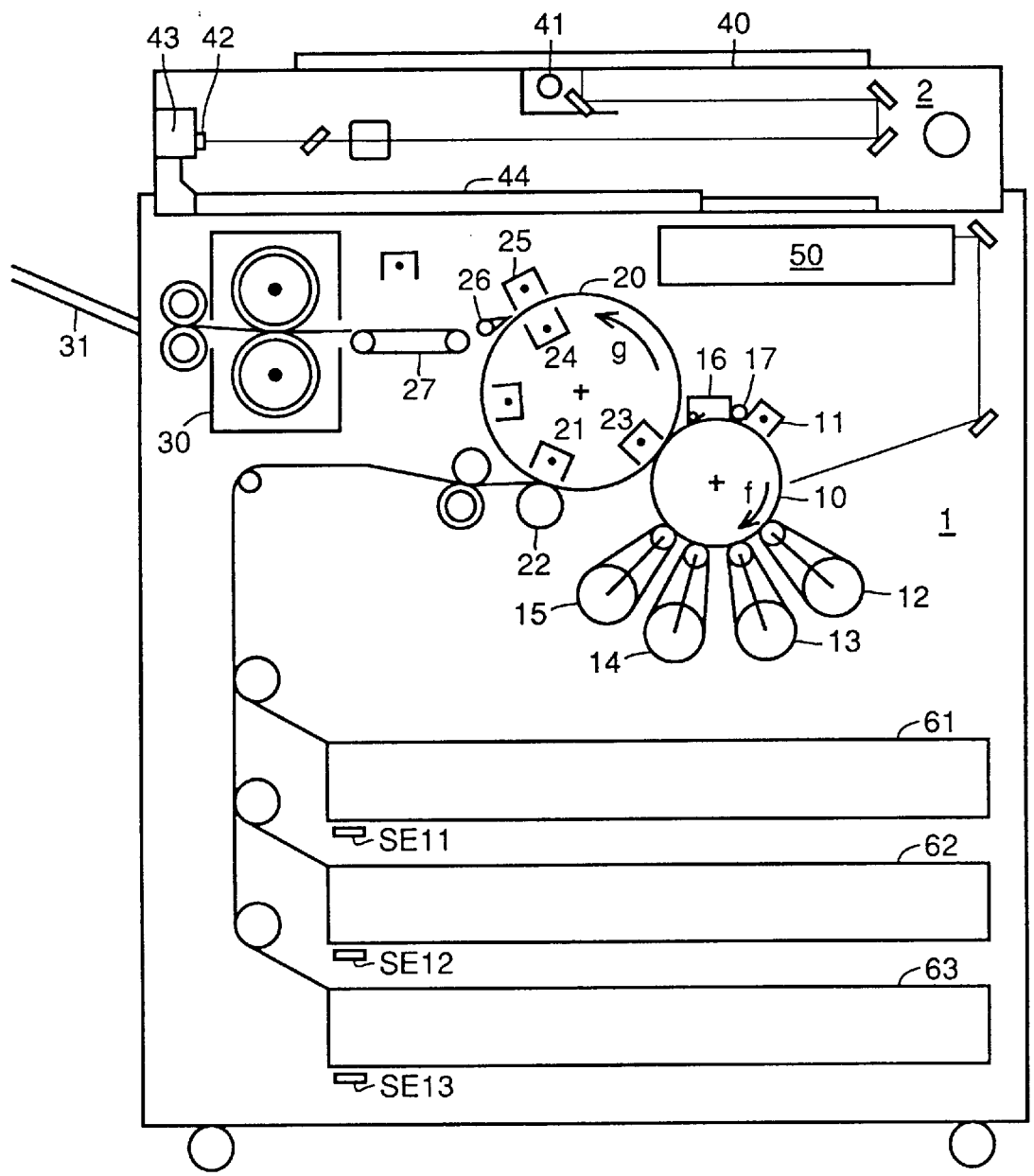
FIG. 1 is a sectional view of an entire structure of a digital copying machine according to a first embodiment of the present invention.

FIG. 1 shows the entire structure of a digital full color copying machine according to a first embodiment of the present invention. Referring to FIG. 1, the digital copying machine includes an image reader unit 2 for reading out an original image, and a printer unit 1 for reproducing the read out image.

In image reader unit 2, an original placed on a platen 40 is exposed by a scanner 41. The reflected light thereof is sensed by a reader optical unit 43 including a CCD sensor 42. The reflected light is read as a multilevel electric signal of the 3 colors of R, G, and B for each pixel by photoelectric conversion. This multi-level electric signal is applied to an image signal processing unit 44 as analog data of the reflectance.

Figure 2:
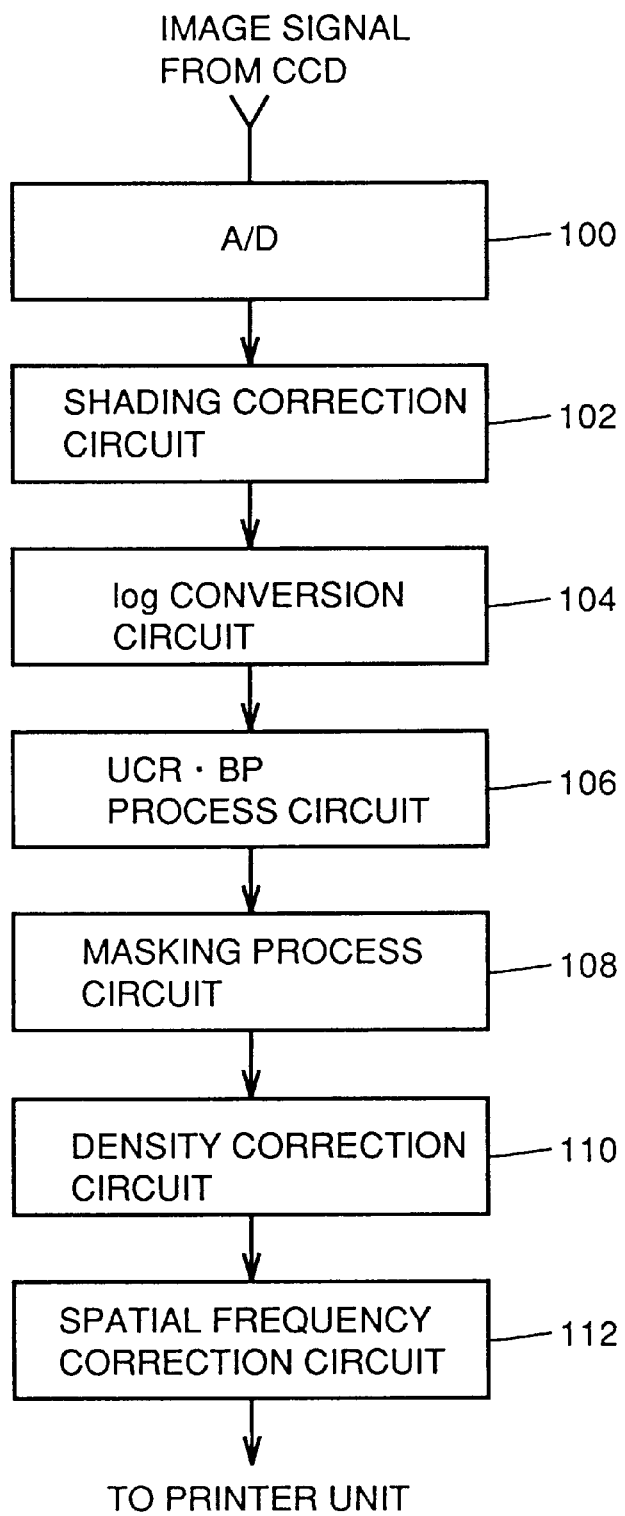
FIG. 2 is a block diagram showing a structure of an image forming unit of the digital copying machine of FIG. 1.

FIG. 2 is a block diagram showing a structure of image signal processing unit 44. The process flow of an image signal from CCD sensor 42 to printer unit 1 via image signal processing unit 44 will be described with reference to FIG. 2. In image signal processing unit 44, reflectance data of R, G, and B, respectively from CCD sensor 42 subjected to offset and gain corrections is converted into a multi-level digital value by an A/D converter 100. The converted value is subjected to shading correction in a shading correction unit 102. The corrected digital value is converted into density data by a log conversion circuit 104. By an under color removal • black print circuit 106, the common area of the three colors of data is calculated as black data, and the black data is subtracted from the data of the three colors to improve the reproducibility of black. In a masking processing circuit 108, the R, G, and B data are converted into signals of Y, M, C, and Bk. In a density correction circuit 110, the density is corrected by multiplying the data of Y, M, C, and Bk by a predetermined coefficient. A spatial frequency correction circuit 112 applies a smoothing operation on the data. The processed data is sent to printer unit 1 as print data.

Returning to FIG. 1, a photoconductor drum 10 is installed slightly rightwards of the center in printer unit 1. Photoconductor drum 10 can be rotatably driven in the direction of arrow f. A transfer drum 20 is installed in the vicinity of photoconductor drum 10. Transfer drum 20 is driven rotatably in the direction of arrow g. Also, a corona charger 11, magnetic brush type development devices 12–15, a transfer charger 23, a cleaning device 16 for residual toner, and an eraser lamp 17 are sequentially disposed around photoconductor drum 10. An image is projected on photoconductor drum 10 by a print head unit 50 right after the charging process. Sheet attachment chargers 24 and 25, and a detach claw 26 are disposed around transfer drum 20.

Print head unit 50 generates exposure data by D/A conversion after applying gradation correction ($\gamma$ correction) on the input signal according to the image reproducibility such as for the photoconductor and development characteristic. The laser is driven by print head unit 50 according to the exposure data to expose photoconductor drum 10 that is driven rotatably.

Figure 3:
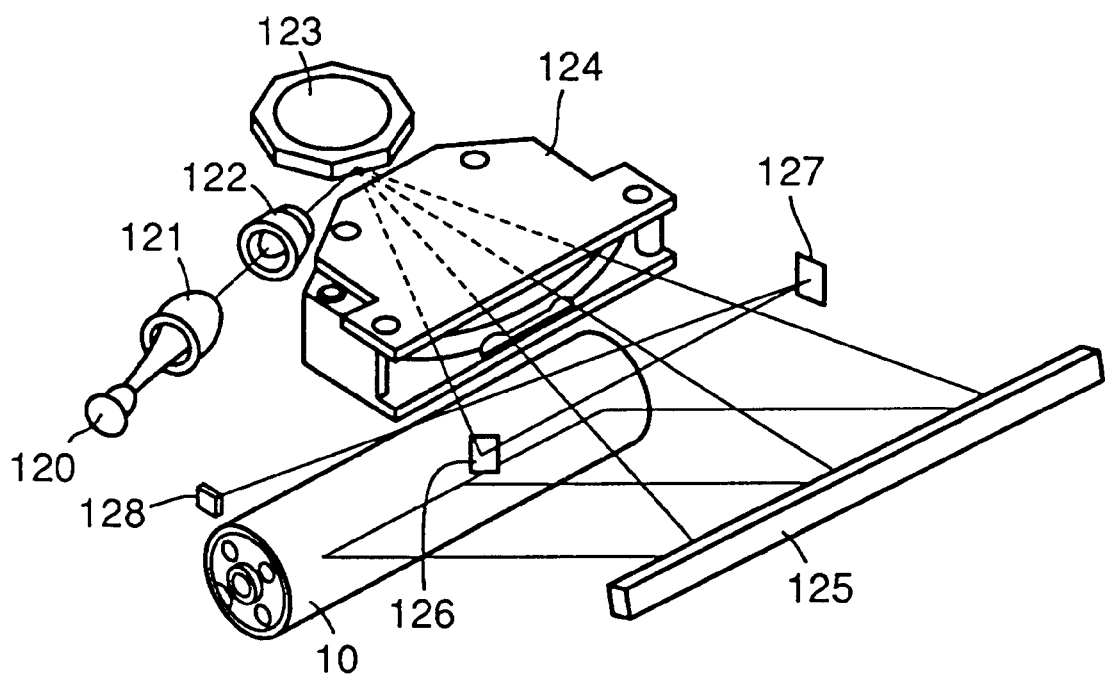
FIG. 3 is a perspective view showing an optical system of a printer unit of the digital copying machine of FIG. 1.

FIG. 3 is a perspective view showing a structure of a laser optical system in printer unit 1. Referring to FIG. 3, a laser beam emitted from a semiconductor laser element 120 according to a drive signal passes through a collimator lens 121 and a cylindrical lens 122 to be injected upon one face of a polygon mirror 123. The beam reflected at this face passed through an f-$\theta$ 124 to be reflected at a mirror 125. This reflected light exits outside the optical unit from a slit (not shown) to be directed onto photoconductor drum 10. Photoconductor drum 10 is exposed in the axial direction. As polygon mirror 123 rotates, the direction of emission of the beam reflected at one of the faces of polygon mirror 123 varies as shown in the drawing to scan photoconductor drum 10 in the axial direction. In order to provide synchronization of scanning in the axial direction, the laser beam is reflected at mirrors 126 and 127 to enter a photo diode (SOS sensor) 128 at initiation of a scanning operation. Upon detection of commencement of scanning of the first line by SOS sensor 128, the first line is scanned according to a predetermined light intensity and clock signal provided from a drive I/O 310 and a parallel I/O 311 which will be described afterwards. A similar scanning operation is carried out thereafter to form a latent image within a valid image area.

Returning to the description of FIG. 1, photoconductor drum 10 is subjected to an erase operation by erasure lamp 17 before exposure and then charged uniformly by a corona charger 11. By receiving exposure under this state, an electrostatic latent image of the original is formed on photoconductor drum 10. A two-component developing agent formed of toner and carrier are accommodated in development devices 12, 13, 14 and 15. The electrostatic latent image is rendered into a visual image with a corresponding color toner by appropriate development devices 12, 13, 14 and 15 facing photoconductor drum 10.

In printer unit 1, three stages of automatic sheet feed units 61, 62 and 63 are provided. The size of sheets accommodated in each unit is detected by respective sensors SE11–SE13. The sheet fed out from automatic sheet feed units 61, 62 and 63 is forwarded so as to be in synchronization with an attachment position on transfer drum 20. The sheet is attracted electrostatically on a transfer film by sheet attraction roller 22 and sheet attraction charger 21. The developed image on photoconductor drum 10 is transferred onto the sheet attracted on transfer drum 20 by transfer charger 23.

The above-described operation of image reading, latent image formation, development, and transfer processes is repeated for the required number of colors (generally 4 times for a full color image formation). Then, the sheet is detached from transfer drum 20 by separation chargers 24 and 25 and detachment claw 26 to be forwarded to a fixing unit 30 through a transportation device 27. The toner image is heat-fixed on the sheet. Then, the sheet is output to a discharge tray 31.

The printer control system of the digital copying machine of FIG. 1 will be described with reference to the block diagram of FIG. 4.

Figure 4:
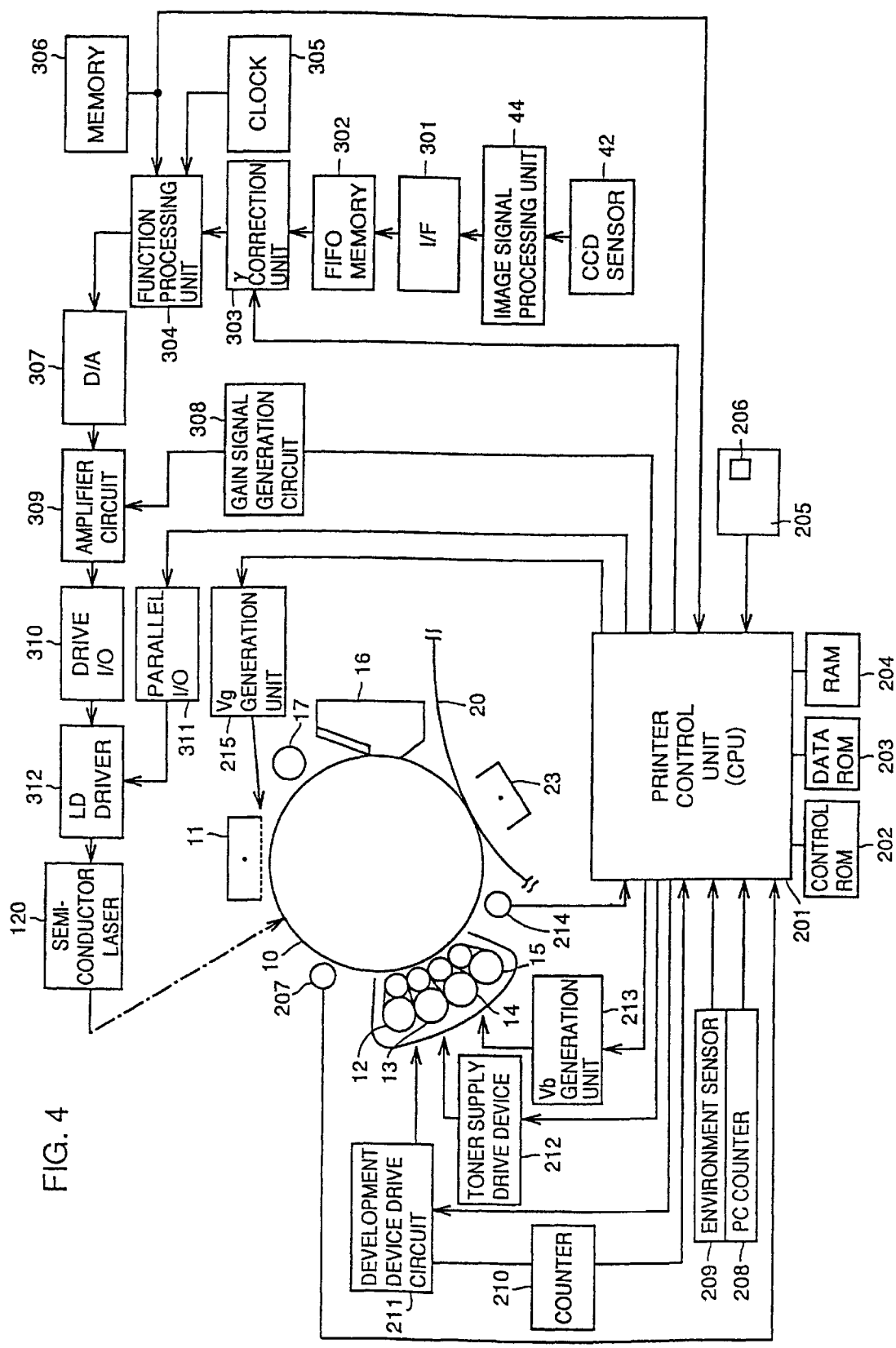
FIG. 4 is a block diagram showing a structure of a printer control system of the digital copying machine of FIG. 1.

Referring to FIG. 4, the digital copying machine further includes a printer control unit 201. A control ROM 202, a data ROM 203, and a RAM 204 are respectively connected to printer control unit 201. Various programs for control are stored in control ROM 202. Various data required for automatic density control and $\gamma$ correction control are stored in data ROM 203. Printer control unit 201 carries out print operation control, automatic density control and $\gamma$ correction control, and the like according to various data stored in control ROM 202, data ROM 203, and RAM 204.

An operation panel 205, a photoconductor drive counter 208, and an environment sensor 209 are also connected to printer control unit 201. Furthermore, an AIDC sensor 214, a development device drive counter 210, and a V sensor 207 are connected to printer control unit 201. Various operation commands are applied from operation panel 205 to printer control unit 201. A reset signal is also input via reset button 206 to printer control unit 201. A detection signal of a surface potential of photoconductor 6 from V sensor 207, a detection signal which is an optical detection of the amount of toner adhering onto the surface of photoconductor 6 from AIDC sensor 214, a signal indicating the number of times of drive of photoconductor 6 from photoconductor drive counter 208, a signal indicating environment characteristics such as temperature and humidity from environment sensor 209, and a signal indicating the number of times of drives of development devices 12, 13, 14 and 15 from development device drive counter 210 are applied to printer control unit 201.

Printer control unit 201 controls a Vg generation unit 215 generating a grid potential Vg of corona charger 8, and a Vg generation unit 213 generating a development bias potential Vb for each of development devices 12, 13, 14 and 15 to provide automatic density control and $\gamma$ correction control according to each input information.

Image data (8 bits) from image signal processing unit 44 is applied to a first-in-first-out memory (referred to as FIFO memory hereinafter) 302 via an interface unit 301. FIFO memory 302 is a line buffer memory that can store image gradation data of a predetermined number of lines in the main scanning direction. It functions to absorb the difference in the operating clock frequency between image reader unit 2 and printer unit 1.

The data of FIFO memory 302 is applied to $\gamma$ correction unit 303. As will be described in detail afterwards, $\gamma$ correction data of data ROM 203 is applied to $\gamma$ correction unit 303 by print control unit 201. $\gamma$ correction unit 303 sends the light emission level obtained by correcting input data (ID) to a function processing unit 304. 1 pixel is divided into a plurality of sub pixels by a clock signal from clock generation unit 305. A function process is applied on respective input data according to a plurality of functions read out from memory 306. The plurality of functions read out from memory 306 are also provided to printer control unit 201 to be used for calculating light emission characteristic data for γ correction in printer control unit 201.

The data subjected to a function process is sent to D/A conversion unit 307. The light emission level (digital value) is converted into an analog voltage. The analog voltage is amplified at amplifier circuit 309 with a gain set by a gain signal generation circuit 308 corresponding to a gain set value from printer control unit 201. The amplified data is sent to a semiconductor laser (LD) driver 312 via drive I/O 310. Semiconductor laser 120 emits light of an intensity corresponding to the value of LD driver 312.

Figure 5:
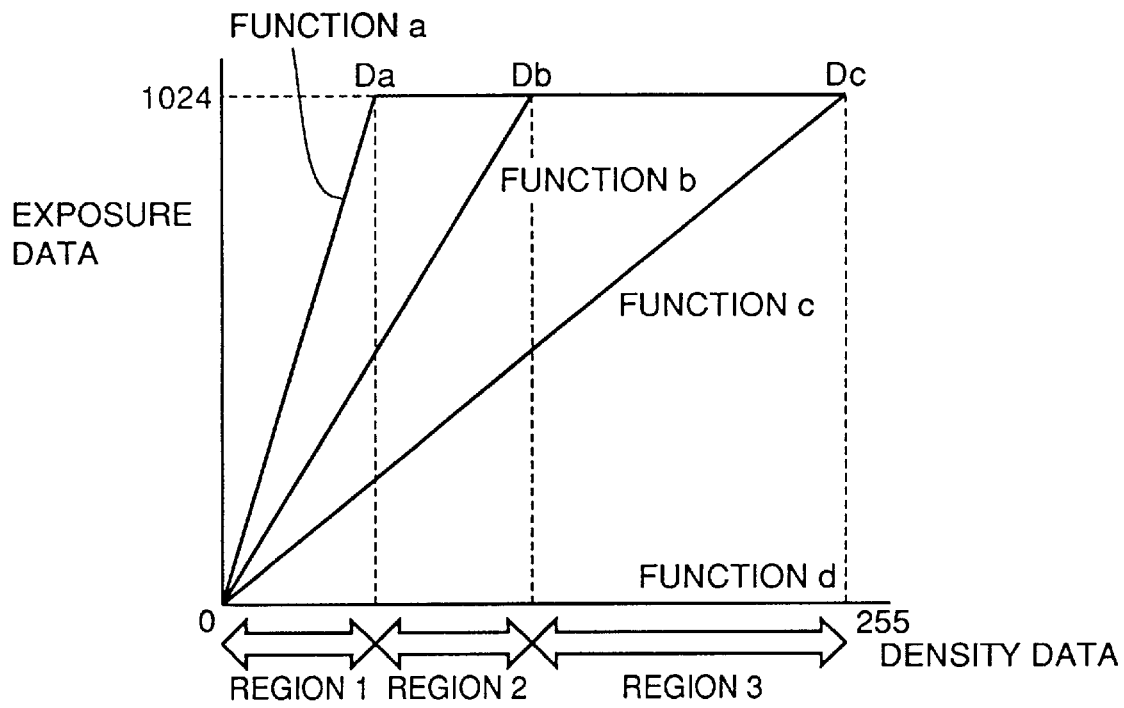
FIG. 5 is a diagram showing functions used for a function process.

Function processing unit 304 will be described in detail hereinafter. FIG. 5 shows an example of the functions used in the present embodiment. Linear functions differing in their slopes are used. Referring to FIG. 5, function a is represented by a linear function that increases monotonously up to a point Da on density data. Function a exhibits exposure at the maximum exposure intensity at points higher than point Da. Function b is represented by a linear expression that increases monotonously up to a point Db (Db>Da) of the density data. Exposure is carried out at the maximum exposure intensity at points greater than point Db. Function c is represented by a linear function that increases monotonously up to maximum value Dc of the density data. Function d is a function that does not carry out exposure no matter what the magnitude of the density data is.

Figure 6:
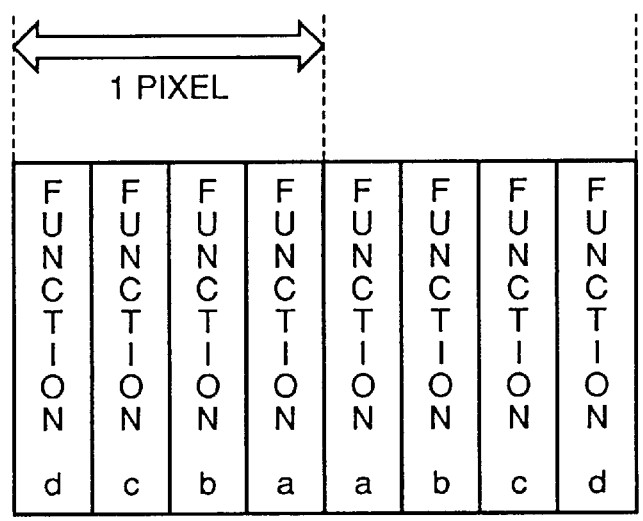
FIG. 6 is a diagram showing function arrangement parameters.

FIG. 6 shows arrangement of functions a to d with respect to each subdivided pixel of a predetermined pixel cycle. This is referred to as "function arrangement parameter". In the present embodiment, the function arrangement parameter is set in a cycle of 2 pixels. The functions are arranged symmetrically about the center in the horizontal direction.

By sending a clock signal of 4 times the modulation frequency to function processing unit 304, light emission of semiconductor laser 120 can be controlled independently at the units of ¼ (25%) of 1 pixel. Therefore, dots are formed by assigning these functions to the sub pixels and applying a function process on the image density data.

Figure 8:
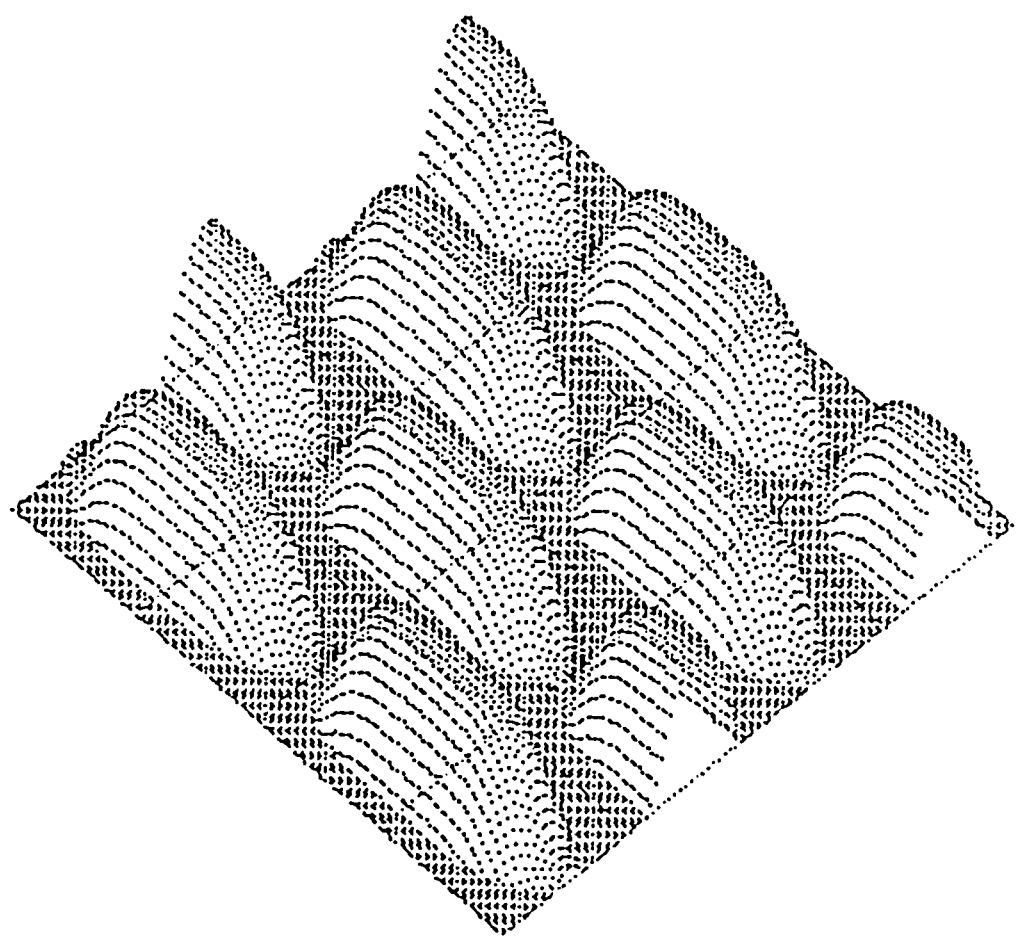
FIG. 8 shows a latent image potential distribution on a photoconductor obtained by simulation using the image data of FIGS. 7A–7C.

FIGS. 7A–7C show exposure data disclosed in Japanese Patent Laying-Open No. 4-13163. FIG. 8 shows the layout of the latent image potential portion on the photoconductor in Japanese Patent Laying-Open No. 4-13163 obtained by simulation. In the present example, one pixel is divided into two. The duty ratio is set to 75% at the cycle of 2 pixels. Since exposure is carried out at a uniform exposure intensity corresponding to density data for each 1 pixel in the light emission unit, a peak cannot be obtained in the exposure data, so that a deep latent image cannot be formed. Furthermore, the image quality is degraded significantly arising from scattering of the formed dot when subjected to the processes of image formation, transfer, and fixing.

Figure 9A:
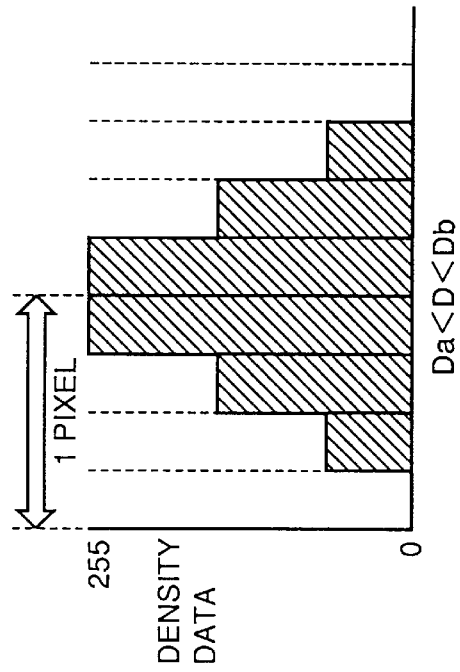
FIGS. 9A–9D show image data processed according to function arrangement parameters.

FIGS. 9A–9D show data subjected to function processing according to the function arrangement parameter. FIG. 9A shows image data subjected to function processing when the density level is D<Da. It is appreciated from the highlight region 1 of FIG. 5 that all functions a to d are monotonous increasing functions. Therefore, functions a to d increase according to a higher density level. By this function process, image data is processed as shown in FIG. 9A.

Figure 9B:
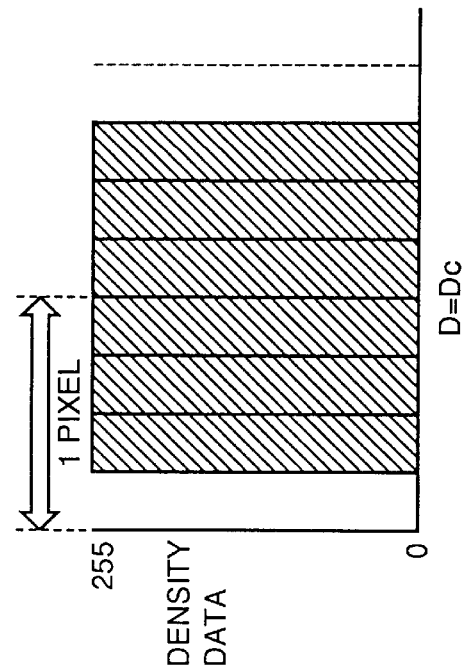

FIG. 9B shows image data subjected to function processing when the density level is Da<D<Db. It is appreciated from half tone region 2 of FIG. 5 that function a has the maximum fixed value of the light emission data, and functions b and c both are monotonous increasing functions. Therefore, functions b and c both increase according to a higher density level. Image data is processed by this function process as shown in FIG. 9B.

Figure 9C:
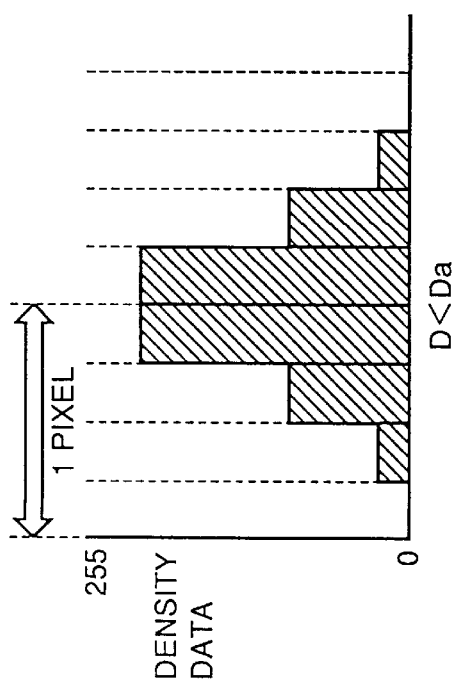

FIG. 9C shows the image data subjected to function processing when the density level is Db<D<Dc. It is appreciated from solid level area 3 of FIG. 4 that functions a and b have the maximum fixed value of image data, and function c increases monotonously. Therefore, only function c increases as the density level becomes higher. The image data is processed by this function process as shown in FIG. 9C.

Figure 9D:
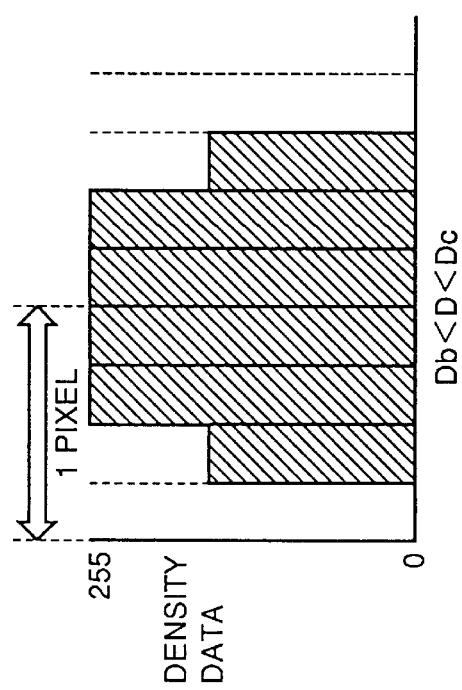

When the density level is maximum (level 255), image data of functions a to c take the maximum fixed values. Therefore, the image data subjected to function processing is as shown in FIG. 9D. As mentioned before, function d always provides no exposure no matter what the level of the density data is.

FIGS. 10A–10D show the correspondence among clock, function arrangement parameter, input image data, and image data subjected to function process (exposure data). The clock is a signal having a frequency 4 times the modulation frequency. The function arrangement parameter is set at the cycle of 2 pixels as shown in FIG. 6. The input image data is subjected to function processing by the function arrangement parameter. The image data subjected to function processing at the bottom is obtained. The light emission intensity of semiconductor laser 120 is modulated corresponding to image data subjected to function process. The duty ratio is 75%.

Figure 11:
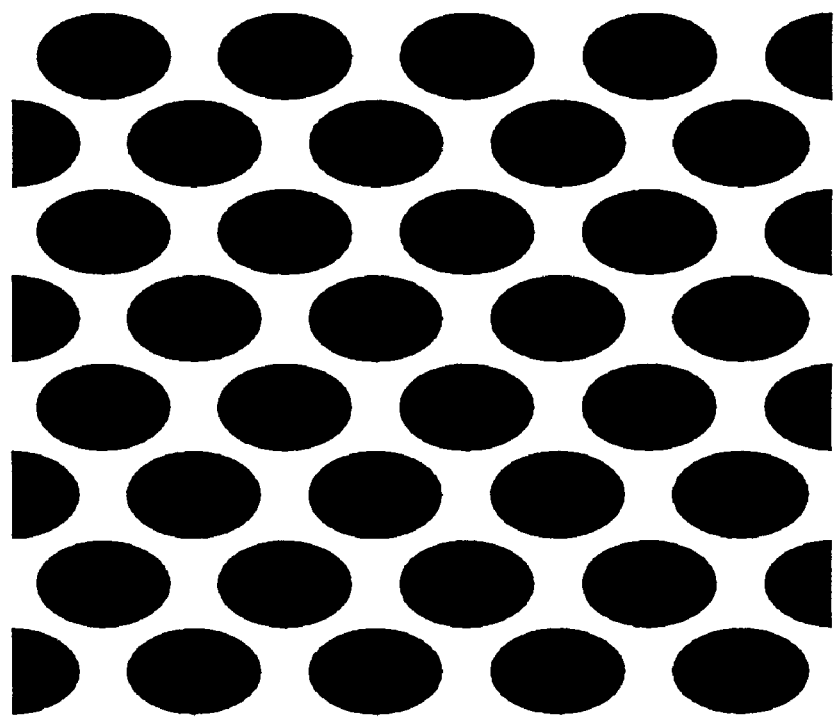
FIG. 11 shows an obtained dot pattern.
Figure 12:
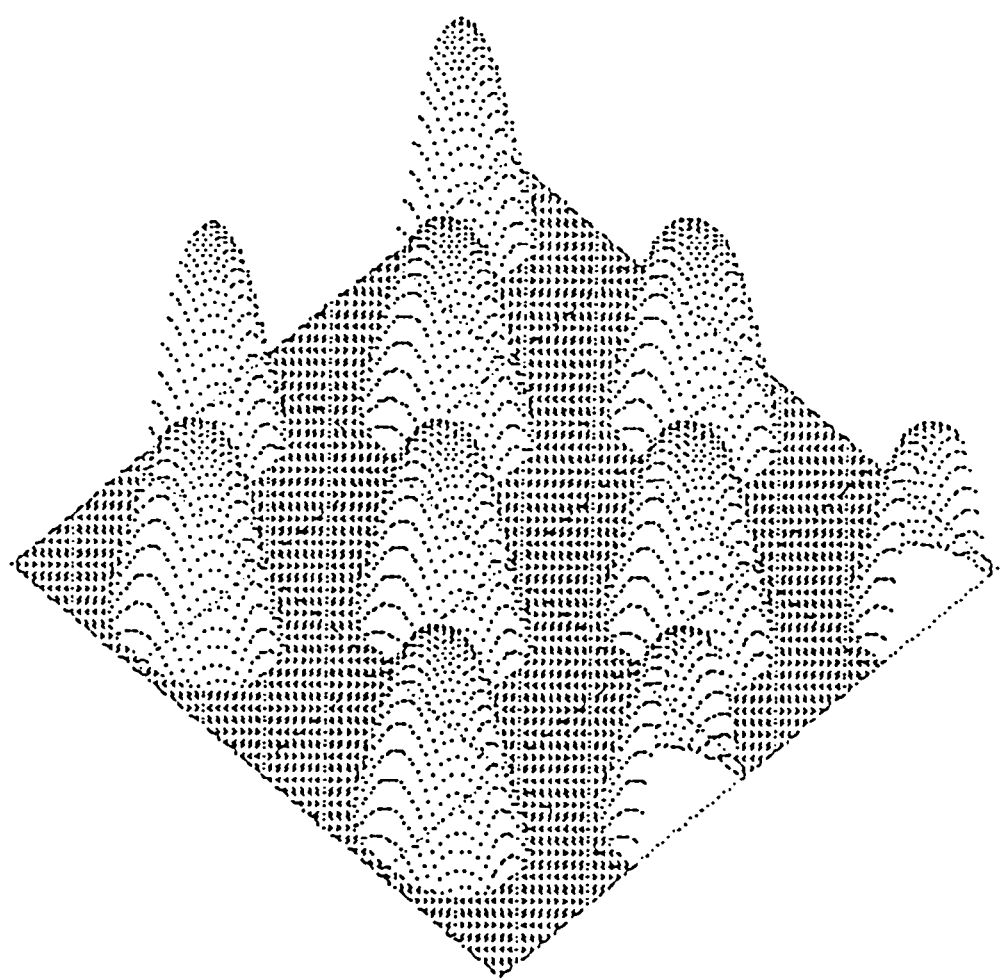
FIG. 12 shows a latent image potential distribution on a photoconductor obtained by simulation.

FIG. 11 shows an example of an image formed at the 2-dot cycle. FIG. 12 shows an example of a latent image potential distribution on a photoconductor obtained by simulation.

According to the above process, control is allowed at an exposure intensity obtained by a function set for each subdivided small pixel in the present embodiment. A peak can be established in the exposure data to allow formation of a deeper latent image. In particular, the graininess of the highlight area to the halftone area is improved significantly. By using the functions and function arrangement parameters shown in FIGS. 4 and 5, a favorable image less affected by overshooting/undershooting of the laser can be formed even if a semiconductor laser of inferior response is used.

Figure 13:
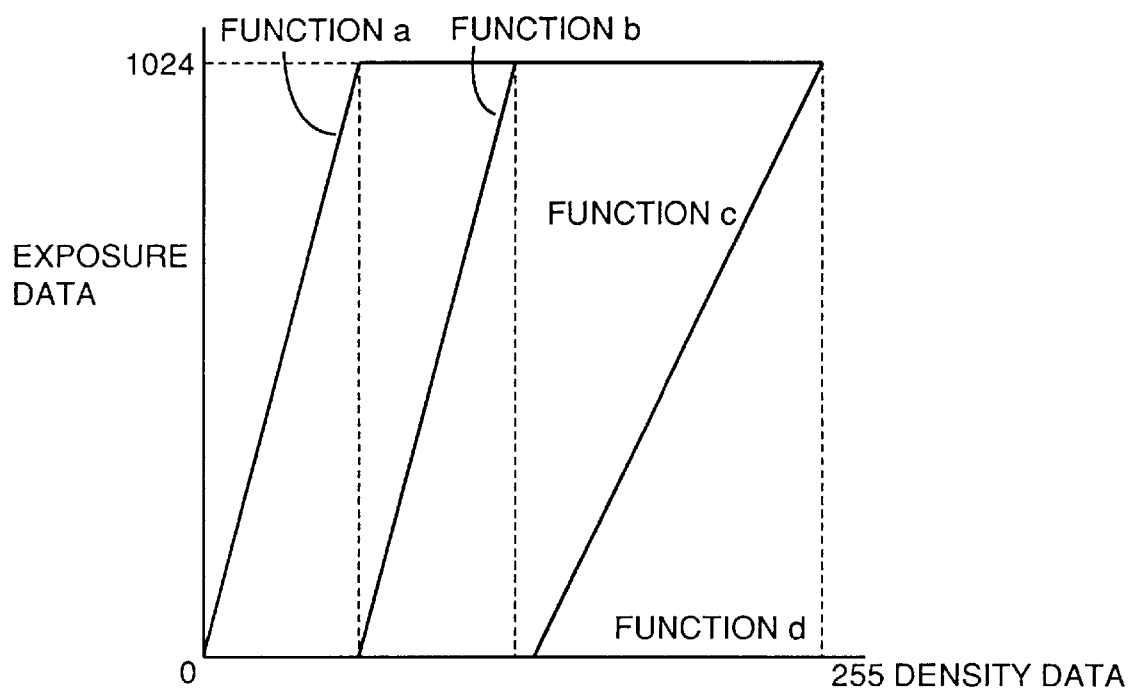
FIG. 13 shows other functions used for function processing.

Although the function and function arrangement parameter used in image formation are implemented by the structures shown in FIGS. 5 and 6 in the present embodiment, the present invention is not limited to such configurations. For example, functions as shown in FIG. 13 may be used. In this case, the image data subjected to function process can provide an image while varying the dot width in the main scanning direction as the density level is increased. There is an advantage that an image can be designed focusing on the graininess of the highlight portion when the function of FIG. 13 is used.

The present invention is not limited to the present embodiment in which four different functions a, b, c and d are assigned to each of the four divided pixels, and two adjacent divided pixels may be assigned with function differing from each other. For example, functions a, b, c and b can be assigned to each of the four divided functions.

The digital copying machine of the above-described structure controls γ correction (image density stabilization control) by appropriately calculating γ correction light emission data used for applying γ correction on image data. In the present embodiment, sensing is carried out by a multi-point input of V sensor 207 and AIDC sensor 214 to calculate and produce γ correction light emission data at every image formation operation. γ correction control of the present embodiment will be described hereinafter with reference to flow charts.

Figure 14:
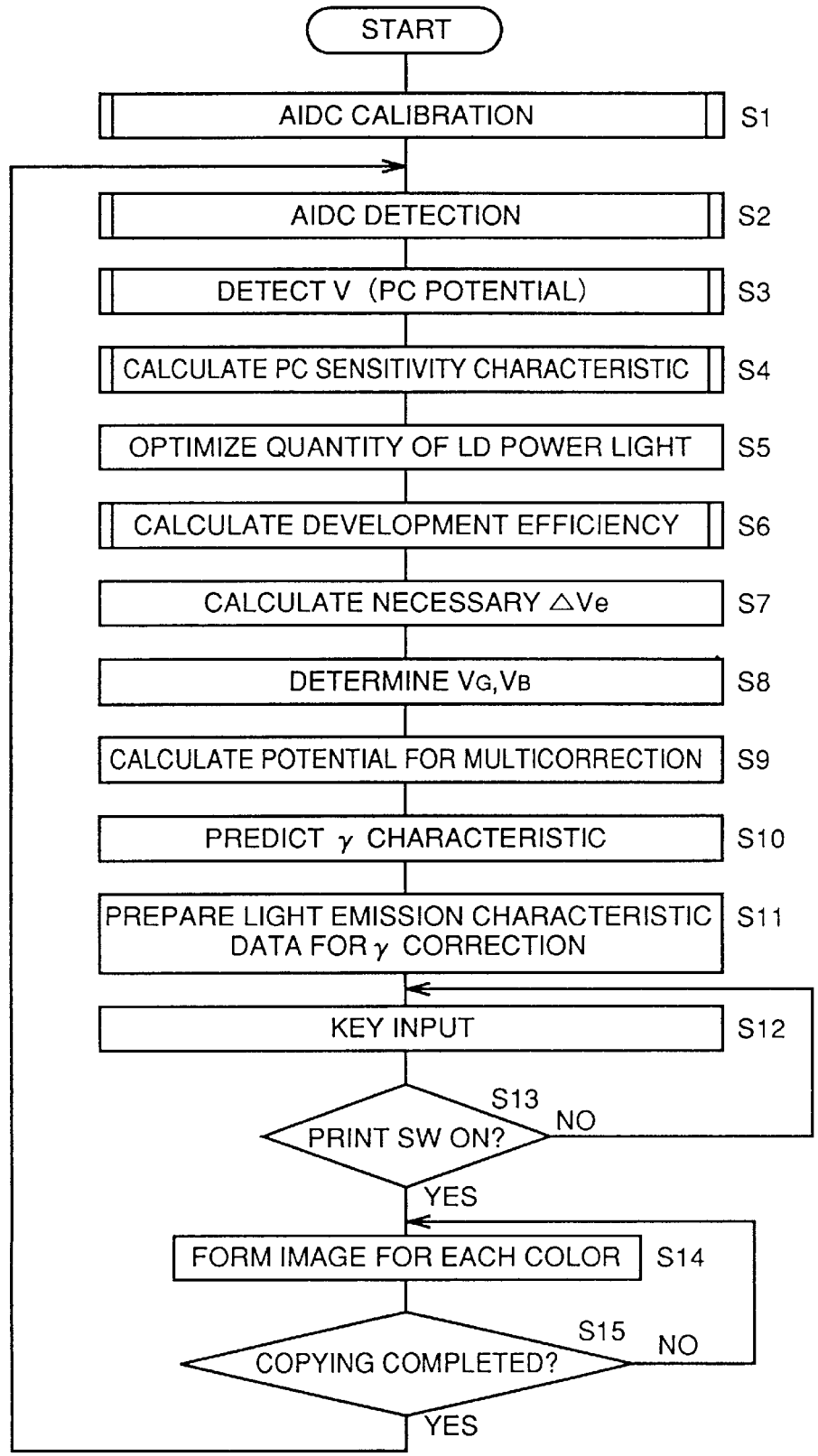
FIG. 14 is a main flow chart of a printer control system of the digital copying machine of FIG. 1.

FIG. 14 is a main flow chart of the printer control system of the digital copying machine of FIG. 1. When the power of the digital copying machine is turned on, an AIDC calibration process is executed at step S1.

Figure 15:
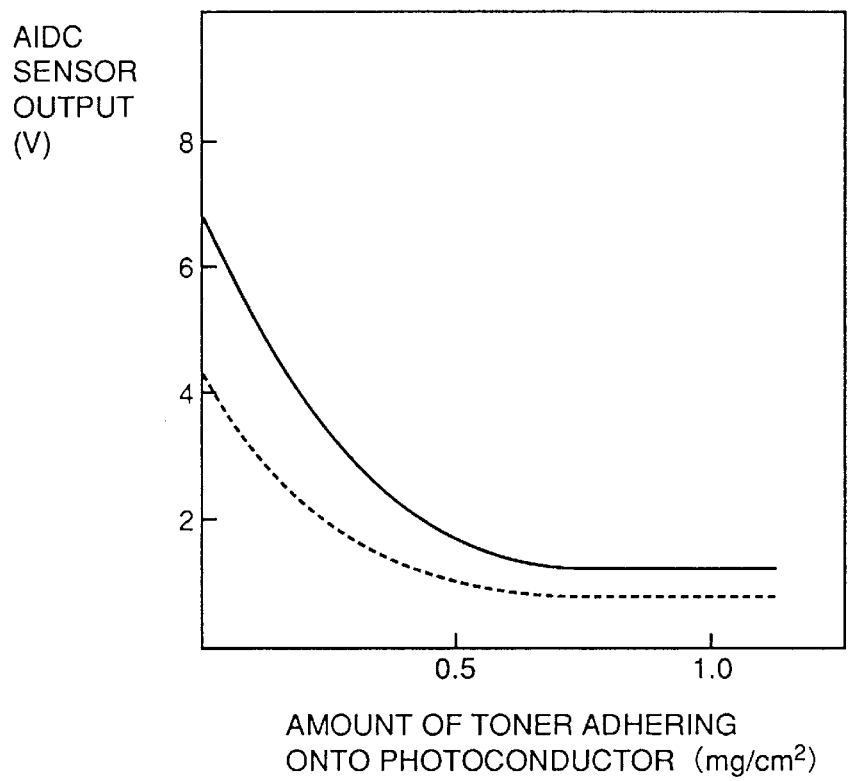
FIG. 15 shows the output characteristic of an AIDC sensor in the cases of with and without contamination.

The output characteristics of AIDC sensor 214 varies according to contamination due to toner particles and variation in the installation of the sensor. FIG. 15 shows the output characteristics of AIDC sensor 214 with and without contamination by a broken line and a solid line, respectively. The output characteristic of C, M, and Y toner is shown in FIG. 15.

When the output characteristic shows a transition from a non-contamination state to a contaminated state (transition from solid line to broken line), an accurate amount of toner adherence cannot be detected since the output characteristic of AIDC sensor 214 is altered even when the amount of toner adherence on photoconductor 10 is identical. Therefore, the relationship between the output of AIDC sensor 214 and the amount of toner adherence is standardized by the output of AIDC sensor 214 corresponding to a test toner image produced at step S1. The standardized output characteristic is set as the output characteristic of AIDC sensor 214.

Figure 16:
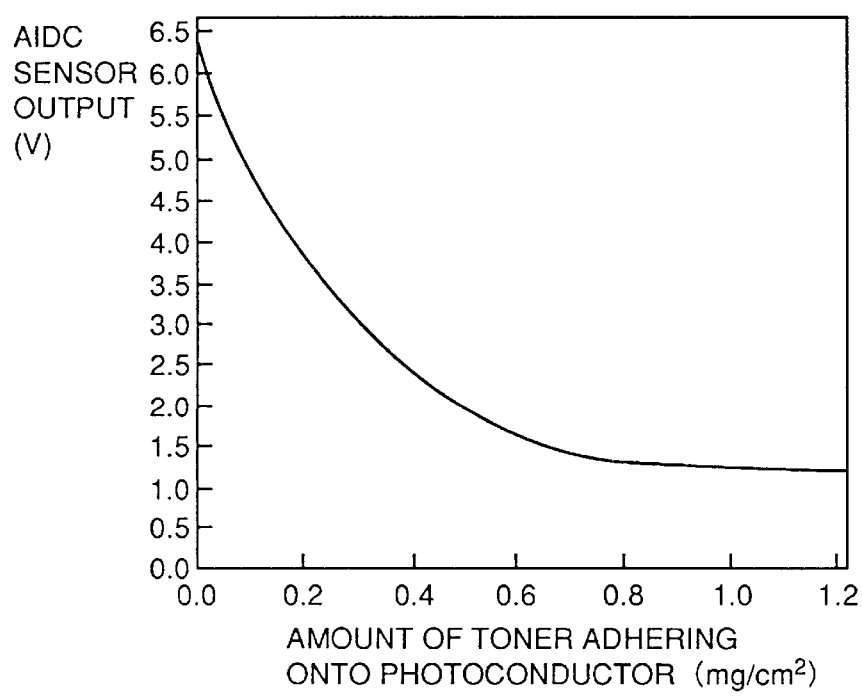
FIG. 16 shows standardized output characteristic of an AIDC sensor of color toner.

Furthermore, since the amount of reflected light differs from color toner to black toner, output characteristics corresponding to color toner and black toner are respectively generated. By the above-described process, the generated output characteristic of AIDC sensor 214 is as shown in FIG. 16 for color toner (cyan toner) and FIG. 17 for black toner.

Figure 18:
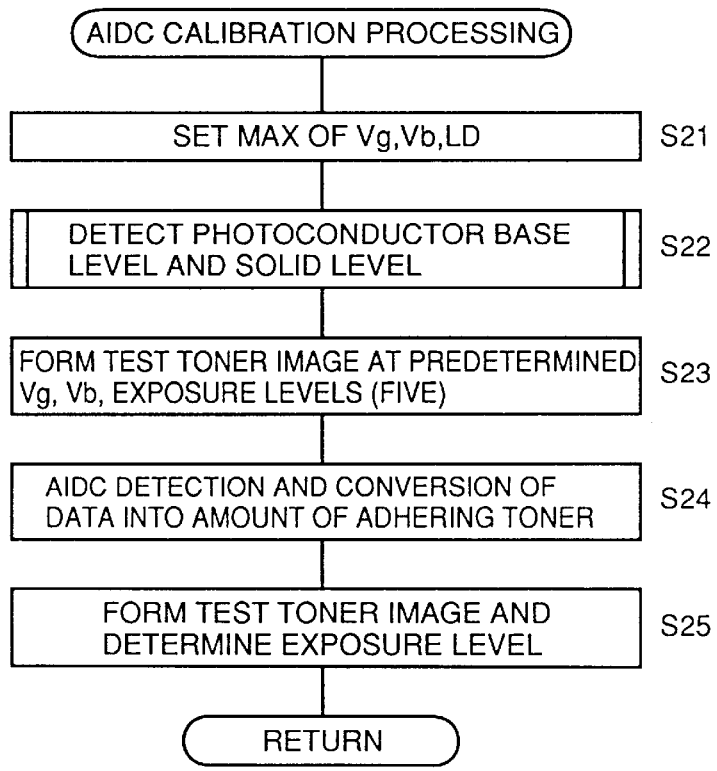
FIG. 18 is a flow chart for describing an AIDC calibration process.

The AIDC calibration process will be described in detail with reference to the flow chart of FIG. 18.

At step S21, the maximum output of each of grid potential Vg, development bias potential Vb, and exposure amount LD to obtain output Vab of AIDC sensor 214 at the solid level where the amount of toner adherence is greatest is set.

Figure 17:
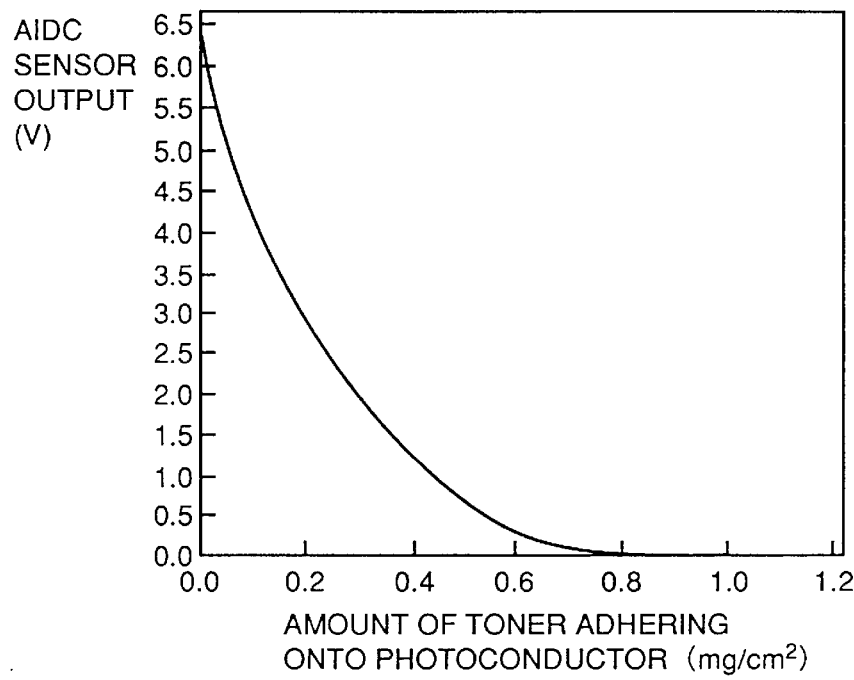
FIG. 17 shows standardized output characteristic of an AIDC sensor for black toner.

At step S22, the photoconductor base level and solid level detection processes are carried out. A test toner image is formed under the conditions set at step S21, and output Vab of AIDC sensor 214 corresponding to the test toner image is detected. Also, output Van of AIDC sensor 214 at a photoconductor base level with no toner image is detected. The relationship between the output of AIDC sensor 214 and the amount of toner adherence (output characteristic of AIDC sensor) is standardized according to these detected values. The standardized relationship is stored in RAM 204. As for output Vab of AIDC sensor 214 corresponding to the solid level, two types of sensor output characteristics for color toner and black toner, for example the cyan toner and the black toner shown in FIGS. 16 and 17, are standardized and stored.

Figure 19:
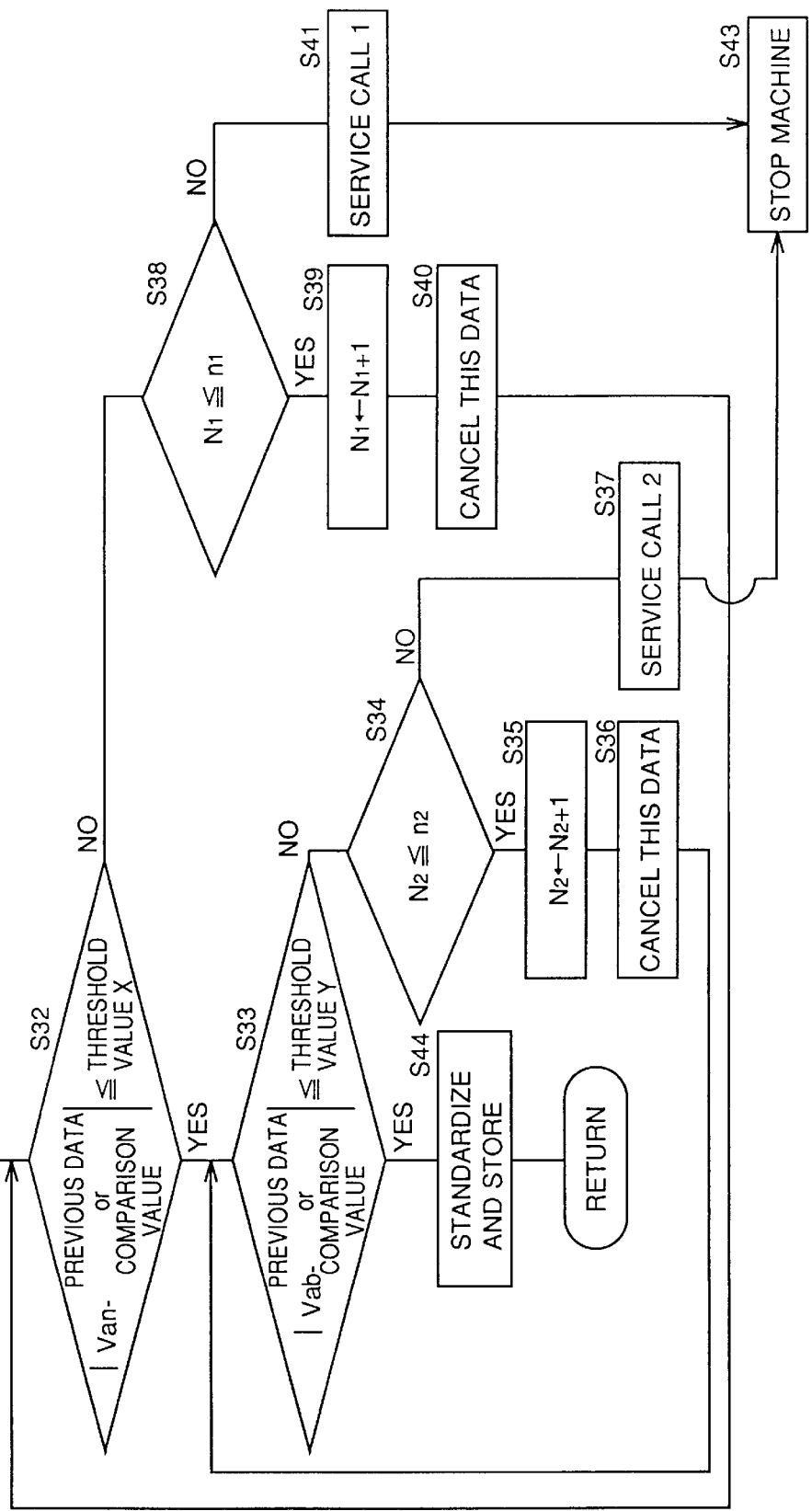
FIG. 19 is a flow chart for describing the detection process of a photoconductor base level and solid level.

The process of step S22 of FIG. 18 will be described with reference to the flow chart of FIG. 19.

At step S31, the detection processes for a photoconductor base level and solid level are carried out. At step S32, the previous data or a preset predetermined comparison value is subtracted from output Van of AIDC sensor 214 of base level. Determination is made whether the absolute value thereof is equal to or less than a predetermined threshold value X. When greater than predetermined threshold value X, control proceeds to step S38, otherwise to step S33.

At step S33, a previous data or a predetermined comparison value is subtracted from output Vab of AIDC sensor 214 of the solid level. Determination is made whether the absolute value of the subtracted result is equal to or less than a predetermined threshold value Y. When the value is greater than threshold value Y, control proceeds to step S34, otherwise to step S44. At step S44, the output characteristic of AIDC sensor 214 is standardized and stored. Then, control proceeds to step S23 to continue the following processes.

When determination is made that the absolute value is greater than threshold value Y at step S33, control proceeds to step S34 to determine whether the number of times $N_2$ exceeding threshold value Y is equal to or less than a predetermined number of times $n_2$. When $N_2$ is equal to or smaller than $n_2$, control proceeds to step S35 to increment the number of times $N_2$ exceeding the threshold value. At step S36, the current data is canceled. Control proceeds to step S33 to continue the following processes.

When the number of times $N_2$ exceeding the threshold value is greater than $n_2$ at step S34, control proceeds to step S37 to execute a service call process (a process for informing the user to call the service personnel such as by providing a predetermined message on the operation panel). At step S43, operation of the machine is inhibited.

When determination is made that the absolute value is greater than threshold value X at step S32, control proceeds to step S38 where determination is made whether the number of times $N_1$ exceeding threshold value X is equal to or less than a predetermined number of times $n_1$. When below $n_1$, control proceeds to step S39. The number of times $N_1$ is incremented. Control proceeds to step S40 where the current data is canceled. Then, control proceeds to step S33 to continue the following processes.

When $N_1$ is greater than $n_1$, control proceeds to step S41. A service call process is carried out. Then, control proceeds to step S43 to turn down the copying machine.

Referring to FIG. 18 again, at step S23, 5 types of test toner images for each color, i.e. for two colors are produced according to predetermined grid potential vg and development bias potential Vb, and 5 different steps of the exposure. As to the exposure level, test toner images are formed for the five gradation levels of 1 (thirty second gradation level), 3 (sixty fourth gradation level), 5 (ninety sixth gradation level), 9 (160th gradation level), and 10 (192nd gradation level) from the twelve steps of the exposure shown in FIG. 6.

At step S24, output Vab of AIDC sensor 214 corresponding to a test toner image produced for each color is detected. The toner adherence amount is obtained from the relationship between the sensor output produced at step S22 for the detected output Vab and output Van of AIDC sensor 214 corresponding to the base level, and the adherence amount.

At step S25, the three exposure levels in which the adherence amount is within the region of 0.05 mg/cm$^2$ to 0.5 mg/cm$^2$ for each color are selected from FIG. 6 according to the toner adherence amount obtained at step S24. The three exposure levels are stored.

The reason why the exposure level is selected so that the toner adherence amount is within the above-described range is set forth in the following. The regular reflection light component on the surface of photoconductor 10 is reduced as the amount of toner adherence increases to result in a lower output of AIDC sensor 214. The detection sensitivity of the sensor is also degraded. When the amount of adhering toner exceeds a certain amount, the output of AIDC sensor 214 will be completely saturated. Therefore, in order to improve the detection accuracy of the sensor, a region where the toner adherence amount is 0.05 mg/cm$^2$ to 0.5 mg/cm$^2$ is preferred in the present embodiment.

Referring to FIG. 14 again, an AIDC detection process is carried out at step S2 after the AIDC calibration process. The AIDC detection process is a subroutine for obtaining the toner adherence amount using AIDC sensor 214.

First, 12 test toner images of 3 steps of exposure level×4 colors are produced under a predetermined grid potential Vg and development bias potential Vb. The three steps of the exposure levels are the three exposure levels selected at step S25. The amount of toner adherence of each produced test toner image is detected using AIDC sensor 214. More specifically, the amount of toner adherence corresponding to the output of AIDC sensor 214 is obtained on the basis of the output characteristics of AIDC sensor 214 obtained at the above step S22.

Figures 20, 21:
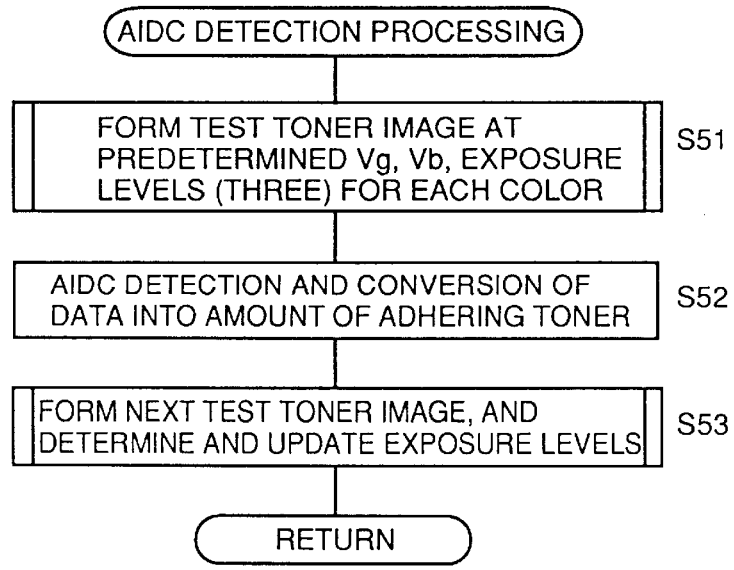
FIG. 20 shows the relationship between the exposure step and the exposure level.
FIG. 21 is a flow chart for describing an AIDC detection process.

The AIDC detection process will be described in further detail with reference to the flow chart of FIG. 21.

At step S51, three test toner images (a test toner image M1 of a low density side, a test toner image M2 of an intermediate density level, a test toner image M3 of a higher density side) are formed on photoconductor 10 for each color under the conditions of a predetermined grid potential Vg (potential identical to that of step S23), development bias potential Vb (potential switched for each color according to estimated darkness decrement ratio), and the three steps of exposure levels selected at step S25.

Figure 22:
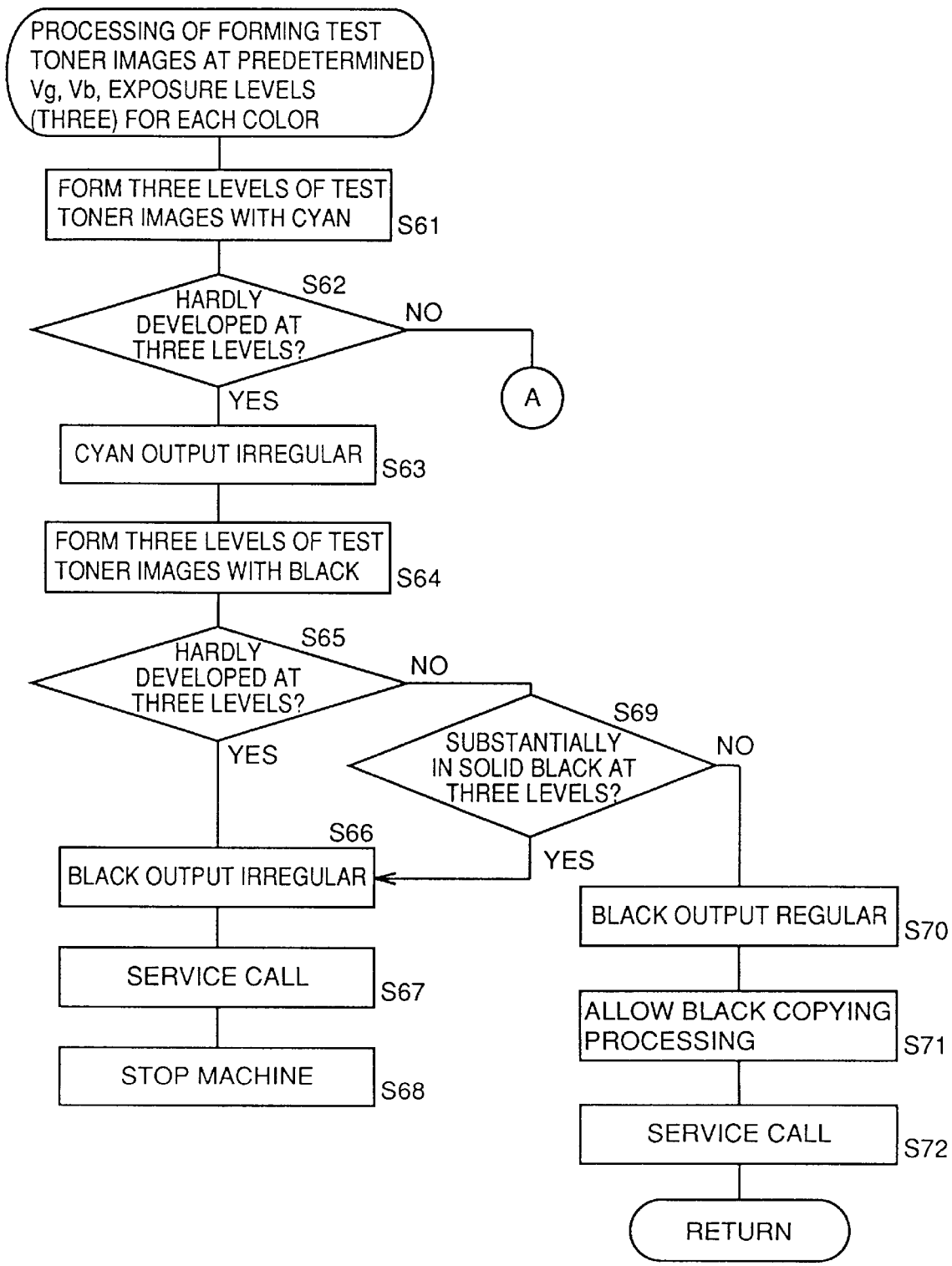
FIGS. 22, 23, and 24 are first, second, and third flow charts, respectively, for describing a test toner image formation process of three levels for each color.
Figure 23:
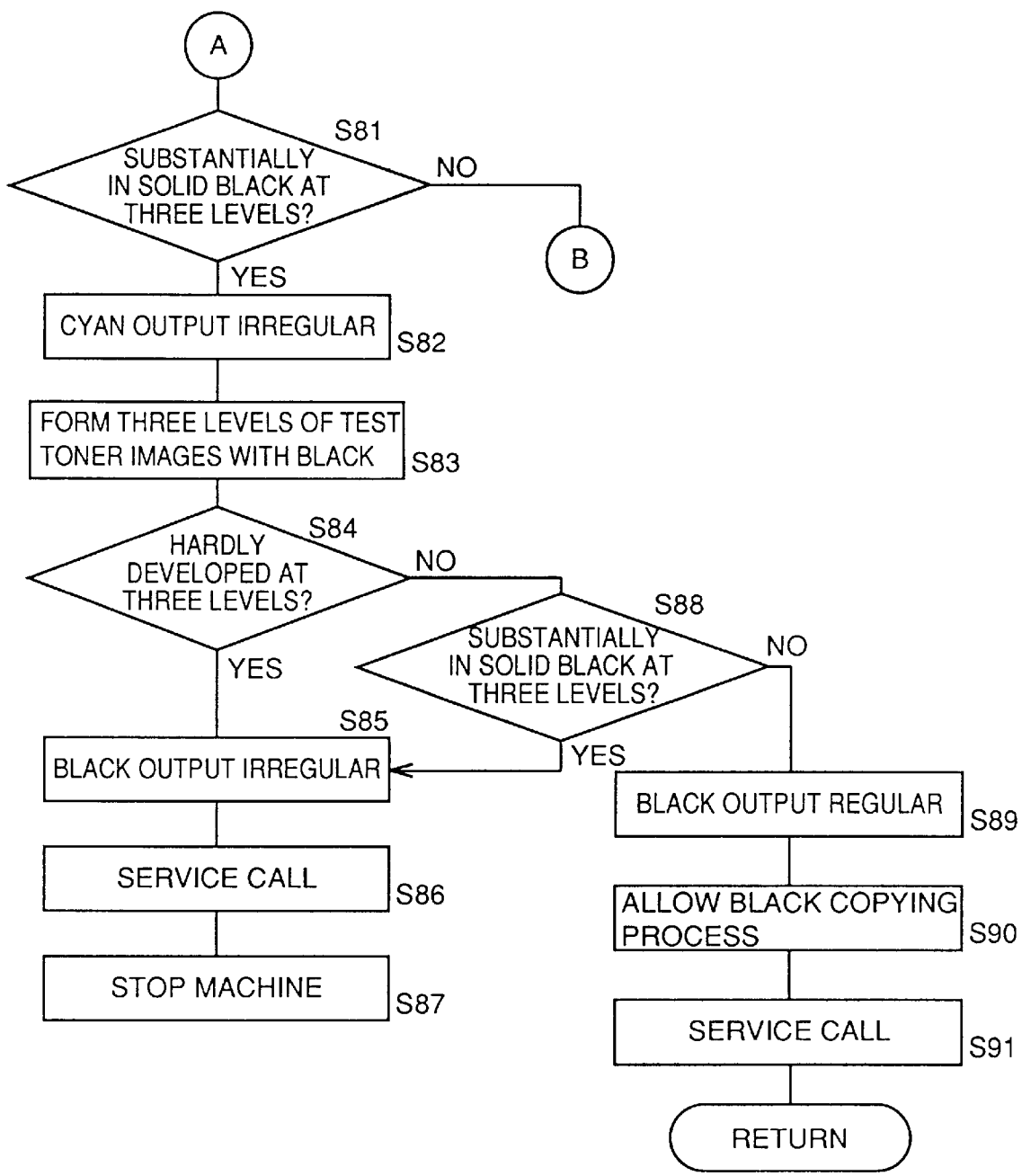
Figure 24:
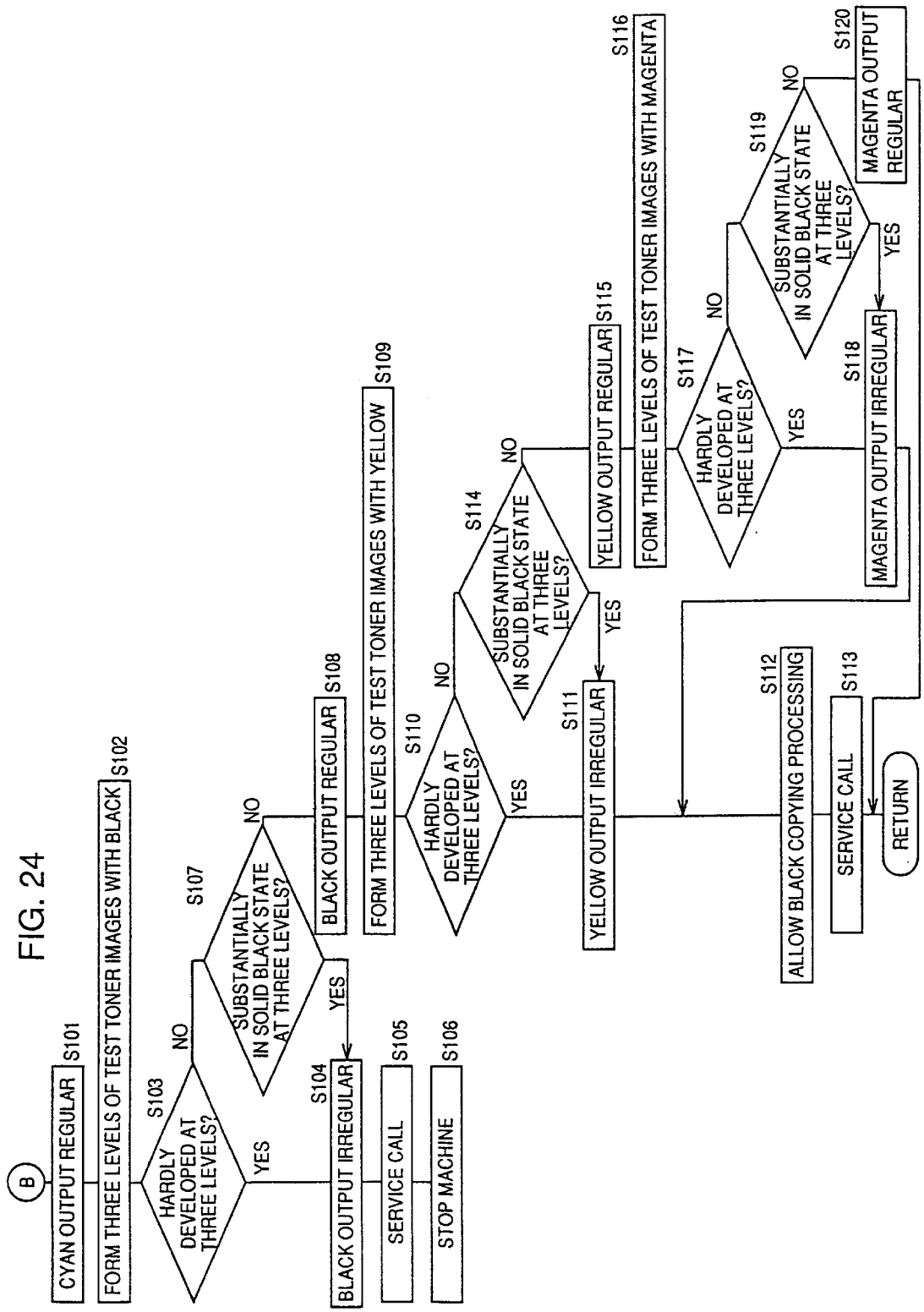

The process of step S51 will be described in further detail. FIGS. 22–24 are first to third flow charts for describing the process of forming a test toner image of three levels.

At step S61 in FIG. 22, test toner images of three levels are produced using cyan toner. At step S62, determination is made whether all the three levels are hardly developed or not. When hardly developed, control proceeds to step S63, otherwise to step S81 shown in FIG. 23.

When hardly developed, determination is made that there is an error in the output during cyan development at step S63. At step S64, test toner images of 3 levels are produced using black toner. At step S65, determination is made whether all three levels are hardly developed or not. When hardly developed, control proceeds to step S66, otherwise to step S69.

When hardly developed, determination is made that there is an error in the output of black development at step S66. At step S67, a service call process is executed. At step S68, the machine is turned down.

When determination is made of development at step S65, control proceeds to step S69 where determination is made whether all 3 levels are outputs of substantially solid black level. When YES, control proceeds to step S70.

At step S70, determination is made that the output of black development is proper. At step S71, only a black copy process using black toner is permitted. At step S72, a service call process is executed. Then, control returns to step S52 of FIG. 21.

When determination is made of development at step S62, control proceeds to step S81 of FIG. 23 where determination is made whether all the three levels are substantially solid level outputs with cyan toner. When the output is of the solid level, control proceeds to step S82, otherwise to step S101 of FIG. 24.

Determination is made that there is an error in the output of cyan development at step S82 when the output is of solid level. The following steps of S83–S91 are similar to the above-described steps of S64–S72. Therefore, description thereof will not be repeated.

When determination is made that the output is not of the solid level at step S81, determination is made that the output of cyan development is proper at step S101 of FIG. 24. At step S102, test toner images of 3 levels using black toner are produced. At step S103, determination is made whether all the three levels are hardly developed or not. When hardly developed, control proceeds to step S104, otherwise to step S107.

Determination is made that there is an error in the output of black development at step S104 when hardly developed. At step S105, a service call process is executed. At step S106, the machine is turned down.

When determination is made of development at step S103, control proceeds to step S107 to determine whether all the three levels are substantially solid level outputs. When the outputs are of the solid level, control proceeds to step S104 to carry out the following processes, otherwise to step S108.

Determination is made that the output of black development is proper at step S108 when the outputs are not of the solid level. At step S109, test toner images of three levels are produced using yellow toner. At step S110, determination is made whether all the three levels are hardly developed or not. When hardly developed, control proceeds to step S111, otherwise to step S114.

Determination is made that there is an error in the output of yellow development at step S111 when hardly developed. At step S112, a process permitting only a black copy is carried out. At step S113, a service call process is executed. Then, control proceeds to step S52.

When determination is made of development at step S110, control proceeds to step S114 to determine whether all the three levels are outputs of substantially solid level. When the outputs are of the solid level, control proceeds to step S111 to continue the following process. When not of solid level outputs, control proceeds to S115 where determination is made that the output of yellow development is proper.

At step S116, test toner images of 3 levels are generated using magenta toner. At step S117, determination is made whether all the three levels are hardly developed or not. When hardly developed, control proceeds to step S118 where determination is made that there is an error in the output of magenta development. Then, control proceeds to step S112. When developed, control proceeds to step S119 to determine whether all the three levels are outputs of substantially solid levels. When all the outputs are of the solid level, control proceeds to step S118 to continue the following processes. When the outputs are not of the solid level, control proceeds to step S120 to determine that the output of magenta development is proper. Then, control proceeds to step S52.

Thus, when cyan output and black output are proper, and when there is an error in at least one of yellow output and magenta output, only a black copy is allowed. A color copy cannot be provided. When all the colors are proper, a full color copy is permitted. The copying machine is turned down when there is an error in the black output.

Referring to FIG. 21 again, the density of the test toner image is detected by AIDC sensor 214 provided in the proximity of photoconductor 10 at step S52. A process similar to that of step S1 is carried out for output value Va detected for each color. The output characteristic of AIDC sensor 214 stored at step S22 is read out from RAM 204. Output Va of AIDC sensor 214 is converted into the amount of toner adherence using this output characteristic.

At step S53, determination and update of the exposure level of the next test toner image output are carried out according to the result of step S52. More specifically, the three steps of the exposure level for the test toner image produced at step S51 are thereafter determined by the data set and updated at step S53 for each color. This means that the control does not return to step S1 to carry out an AIDC calibration process after a copy operation. The control returns to the AIDC detection process of step S2 to determine the three steps of exposure levels for the next operation in detecting a normal test toner of step S2.

Figure 25:
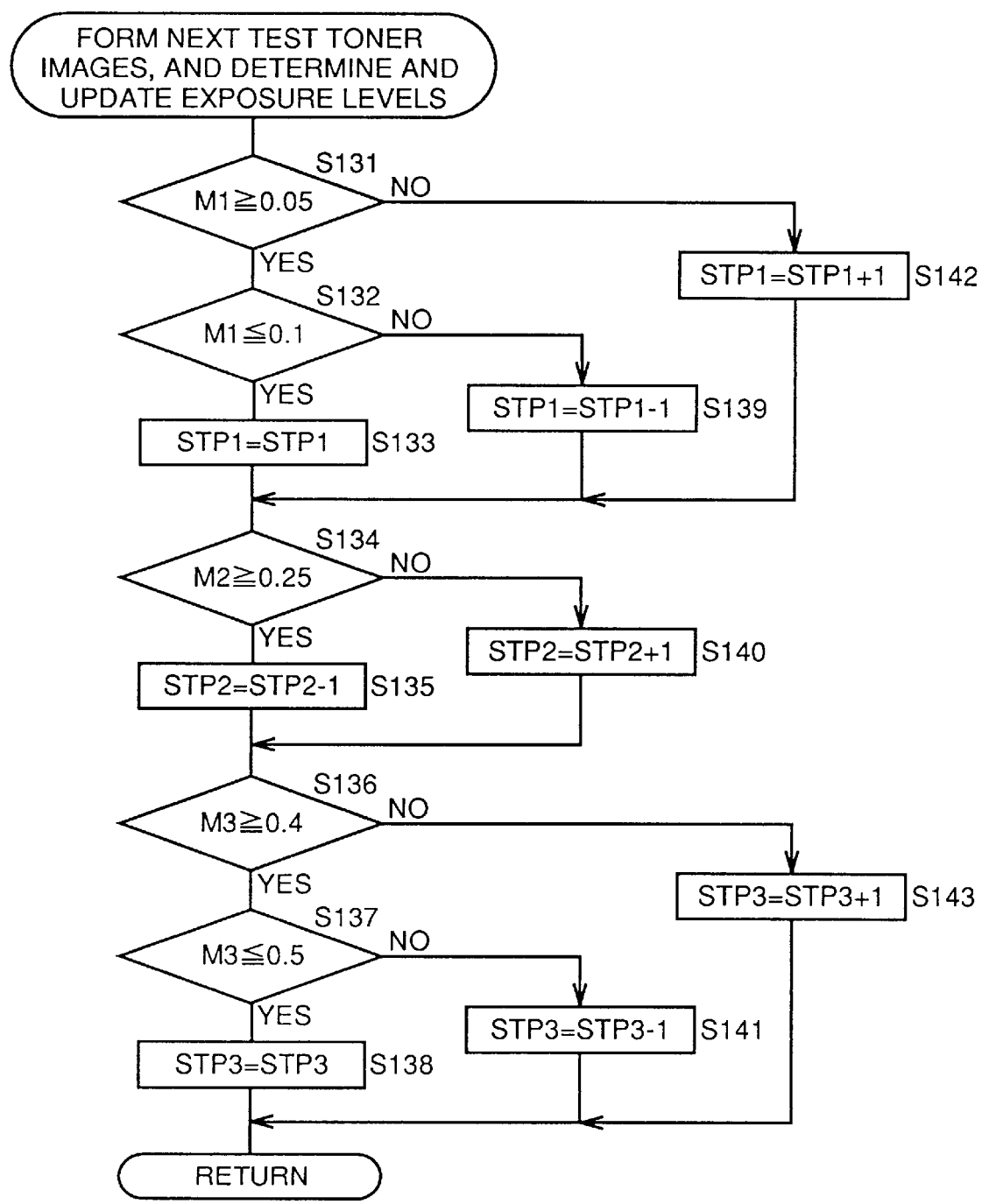
FIG. 25 is a flow chart for describing a determination update process of the exposure level.

The determination and update process of the exposure amount level of step S53 will be described in detail hereinafter with reference to the flow chart of FIG. 25. In the present embodiment, the exposure level of three test patterns (exposure level steps STP1—STP3) is selected for each color according to the process set forth in the following from the exposure level of FIG. 20 so that the amount of toner adherence is within the range of 0.05 mg/cm$^2$ to 0.5 mg/cm$^2$.

At step S131, determination is made whether the toner adherence amount of test toner image M1 is equal to or greater than 0.05 mg/cm$^2$ of each color for test toner image M1 of the lower density side detected at step S52. When the toner adherence amount of test toner image M1 is not greater than 0.05 mg/cm$^2$, control proceeds to step S142. Exposure amount step STP1 of the lower density side is increased by 1 step according to FIG. 20. Then, control proceeds to step S134.

When the toner adherence amount of test toner image M1 is equal to or greater than 0.05 mg/cm$^2$, control proceeds to step S132 to determine whether the toner adherence amount of test toner image M1 is equal to or less than 0.1 mg/cm$^2$. When the toner adherence amount of test toner image M1 is not less than 0.1 mg/cm$^2$, control proceeds to step S139. The exposure level step STP1 is decremented by 1 step according to FIG. 20. That step is set as the exposure level for the lower density side for the next test toner image, and stored in RAM 204.

When the toner adherence amount of test toner image M1 is equal to or less than 0.1 mg/cm$^2$, exposure level step STP1 is not altered at step S133. The exact step is set as the exposure level for the next test toner image formation, and stored in RAM 204.

At step S134, determination is made whether the toner adherence amount of test toner image M2 of the intermediate density level detected at step S52 is equal to or greater than 0.25 mg/cm$^2$. When the toner adherence amount of test toner image M2 is not greater than 0.25 mg/cm$^2$, control proceeds to step S140. Exposure step STP2 of the intermediate density level is increased by 1 step according to FIG. 19. That step is set as the exposure level of the intermediate density in the next test toner image formation, and stored in RAM 204.

When the toner adherence amount of test toner image M2 is at least 0.25 mg/cm$^2$, control proceeds to step S135. Exposure step STP2 is reduced by 1 step, which is set as the exposure level for the next test toner image formation, and stored in RAM 204.

At step S136, determination is made whether the toner adherence amount of test toner image M3 of the high density side detected at step S52 is 0.4 mg/cm$^2$ or greater. When the toner adherence amount of test toner image M3 is not equal to or greater than 0.4 mg/cm$^2$, control proceeds to step S143. Exposure step STP3 of the high density side is incremented by 1 step according to FIG. 20. This step is set as the exposure level for the next test toner image formation of the high density side, and stored in RAM 204.

When the toner adherence amount of test toner image M3 is equal to or greater than 0.4 mg/cm$^2$, control proceeds to step S137 to determine whether the toner adherence amount of test toner image M3 is equal to or less than 0.5 mg/cm$^2$. When the toner adherence amount of test toner image M3 is not less than 0.5 mg/cm$^2$, control proceeds to step S141. Exposure step STP3 is reduced by 1 step, which is set as the exposure level for the next test toner image formation of the high density side. This level is stored in RAM 204.

When the toner adherence amount of test toner image M3 is not higher than 0.5 mg/cm$^2$, control proceeds to step S138. Exposure step STP3 is not altered and exactly set as the exposure level for the next test toner image formation of the high density side. This exposure level is stored in RAM 204.

By the above process, the exposure region level of forming the three test toner images (exposure region steps STP1–STP3) are set and updated so that the toner adherence amount for each color is always within the region of 0.05 mg/cm$^2$ to 0.5 mg/cm$^2$. In the next test toner image formation, light amount steps STP1 to STP3 stored in RAM 204 is read out for each color. The exposure level is set as described above according to FIG. 20. As a result, a test toner image can be formed within a region of high detection density of AIDC sensor 214. The light emission data for γ correction can be calculated at a high accurate level.

Referring to FIG. 14 again, a V (photoconductor surface potential) detection process is carried out at step S3. In this process, the surface potential of photoconductor 10 is detected using V sensor 207. More specifically, a latent image pattern (test pattern) is produced at ten steps of exposure levels (differing from the exposure level steps of FIG. 6) under the conditions of predetermined exposure and grid potential Vg. The surface potential of each latent image pattern formed on photoconductor 10 is detected by V sensor 207. To improve the detection accuracy of the surface potential, the exposure amount and grid potential Vg are switched in 3 stages at the time of power on to form a latent image pattern at 10 steps of the exposure level to detect the surface potential at 3×10 points. When the power is turned on, the surface of photoconductor 10 is erased by erasure lamp 17 after detecting the surface potential at 3×10 points. Then, the surface potential Vr after erasure is detected. At other time points, surface potential Vr of the erased photoconductor 10 is detected after detecting the surface potential of 10 points. Although the surface potential is detected with V sensor 207 in the present process, the surface potential can be directly estimated by a predetermined calculation instead of the above-described direct detection.

Figure 26:
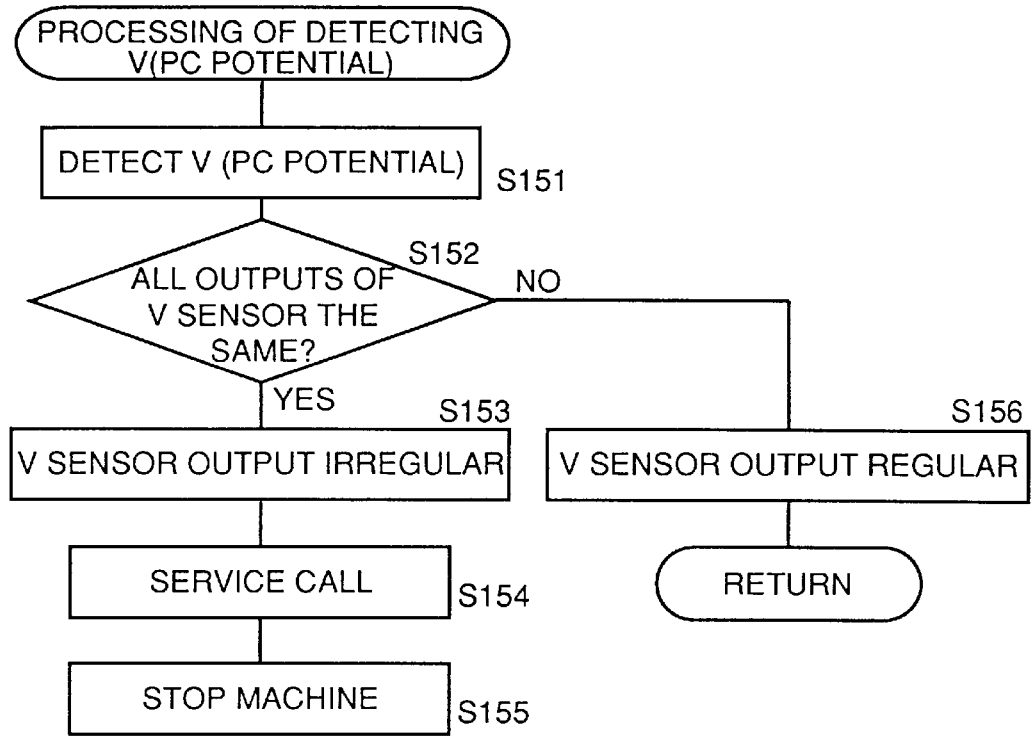
FIG. 26 is a flow chart for describing a V detection process.

The above V detection process will be described in further detail with reference to the flow chart of FIG. 26. At step S151, the above V detection process is executed. At step S152, determination is made whether all the outputs of V sensor 207 are identical. When the outputs are identical, control proceeds to step S153, otherwise to step S156.

When all the outputs of V sensor 207 are identical, determination is made that there is an error in the output of V sensor 207 at step S153. Control proceeds to step S154 to execute a service call process. At step S155, the machine is turned down.

When the outputs of V sensor 207 differ, determination is made that the outputs of V sensor 207 are proper at step S156. Then, control proceeds to step S4. By this process, an error in the output data of V sensor 207 can be detected, whereby the machine is turned down.

The detection operation is completed by the above-described steps S1–S3. The calculation process set forth in the following is then carried out.

Figure 27:
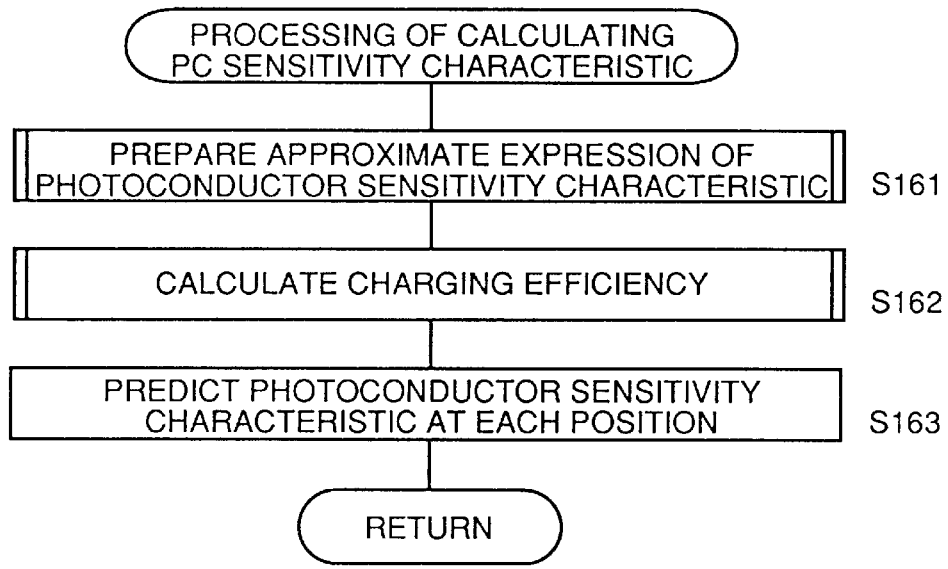
FIG. 27 is a flow chart for describing a photoconductor sensitivity characteristic calculation process.

The photoconductor sensitivity characteristic calculation process of step S4 of FIG. 14 will be described in details with reference to the flow chart of FIG. 27. At step S161, an approximate expression of the sensitivity characteristics of photoconductor 10 is produced. At step S162, a charging efficiency calculation process is executed. At step S163, the estimation process at each position of the photoconductor sensitivity characteristic is carried out. Then, the control proceeds to step S5.

Figure 28:
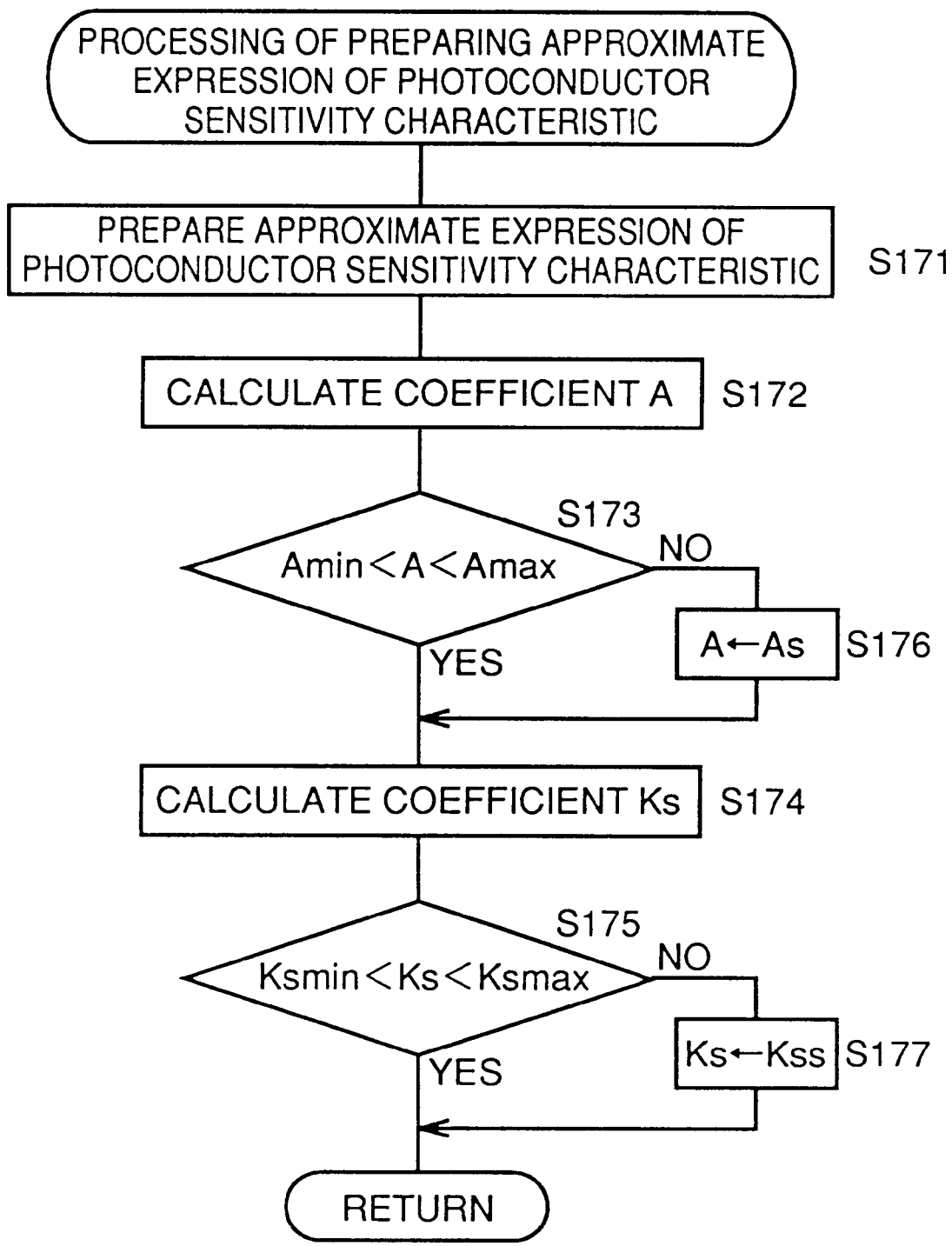
FIG. 28 is a flow chart for describing an approximate expression generation process of photoconductor sensitivity characteristic.

The process of producing an approximate expression of the sensitivity characteristics of photoconductor 10 will be described in further detail with reference to the flow chart of FIG. 28.

At step S171, the sensitivity characteristic of photoconductor 10 is calculated. More specifically, a brightness decrement curve of photoconductor 10 is approximated using the surface potential data of photoconductor 10 with respect to the 10 levels of latent image patterns detected at the above step S3. The photoconductor brightness decrement curve can be approximated by the format of $Vxe^{a*x+b}$ since it has simple decay characteristics. Each coefficient is obtained by the least squares method.

The method of producing an approximate expression of the photoconductor brightness decrement curve will be described hereinafter. According to surface potential V of photoconductor 10 detected by the detection data of step S3, approximation is carried out in a form including exposure ripple to allow calculation of the effective development potential. More specifically, assuming that the value detected by an electrometer is the average potential by the exposure ripple, the factors of the approximate expression shown below are obtained by the least squares method in the form of an average potential of the maximal value and minimum value of the ripple.

$$V = (Vbi - Vr) \times (e^{(-B*E(n)*D/Ks)} + e^{(-A*E(n)*D/Ks)})/2 + Vr \quad (1)$$

$$B = 2 - A + 0.18 \times (A-1)^3 \quad (2)$$

Vbi: surface potential under bias exposure ($\neq V_0$)

Vr: residue potential

E(n): subtraction of bias amount of light from average exposure amount (modulation exposure in each gradation)

A: maximum value under average exposure (coefficient)

B: minimum value under average exposure (coefficient)

Ks: sensitivity coefficient of photoconductor

D: ratio of exposure turn on to modulation time n: gradation for test patterns (n=~10)

The sign of "*" indicates multiplication in the exponent. In the present embodiment, a semiconductor laser (laser diode) is used as the light source for image writing. In order to improve the response of light emission of the laser diode, a bias current is constantly applied, whereby the laser diode emits light spontaneously. Therefore, the above Vbi indicates the photoconductor surface potential under exposure by spontaneous light emission.

In the above approximate expression, surface potential Vbi under bias exposure is set as the initial value for attenuation according to the facility and reliability of detection. The surface potential V of photoconductor 10 at an arbitrary grid potential Vg and exposure amount under the actual usage environment can be calculated using the coefficients obtained by the above approximate expression.

In order to obtain the coefficients of A, B, and Ks using the least squares method, first it is necessary to determine the initial value. Initial value Ks0 of Ks is determined by the following equation.

$$Ks0 = \frac{1}{12} \sum_{m=0}^{2} \sum_{n=0}^{4} \left\{ \frac{E(n,m) \times D - E(0)}{\ln\left(\frac{Vs(n,m) - Vr}{Vbi - Vr}\right)} \right\} \quad (3)$$

Vs(n): average surface potential (detection potential of each gradation)

m : grid potential Vg of corona charger 1.4 is used as the initial value of A.

Figure 29:
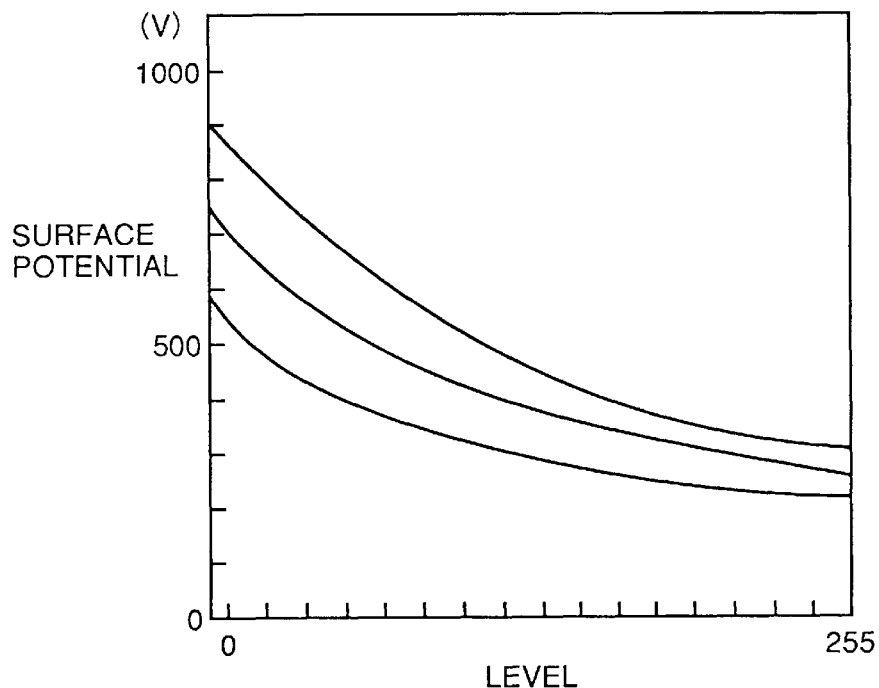

According to the above process, the surface potential of photoconductor 10 is detected switching the exposure amount and grid potential Vg 3 times when power is turned on. Therefore, 3 brightness decay curves of the photoconductor, i.e. three sensitivity characteristic curves of photoconductor 10 are produced. FIG. 29 shows the sensitivity characteristics of photoconductor 10 when power is turned on. At all times other than when power is turned on, one photoconductor sensitivity characteristic curve is produced since the surface potential is detected only once. Ks and A obtained by the above process are coefficients to obtain the photoconductor surface potential at the position of v sensor 207. Therefore, these coefficients are indicated as Ksv and Av in the following description.

Referring to FIG. 28 again, coefficient A is calculated at step S172 as described above. At step S173, determination is made whether coefficient A is between maximum value Amax and minimum value Amin that are determined in advance. When coefficient A is between Amin and Amax, control proceeds to step S174, otherwise to step S176. At step S176, coefficient A is modified to a predetermined value As. The previous calculated coefficient A or a predetermined set value is used as As.

At step S174, coefficient Ks is calculated as described above. At step S175, determination is made whether coefficient Ks is between minimum value Ksmin and maximum value Ksmax that are determined in advance. When coefficient Ks is within this range, control proceeds to step S162, otherwise to step S177. At step S177, coefficient Ks is modified to a predetermined value Kss. The previous calculated coefficient Ks or a predetermined set value is used as Kss.

Comparison with the prior calculated result or with the initial set value is made. When the difference or ratio exceeds the set threshold value, the current value is regarded to be irregular. The previous calculated result or initial set value is employed, and control proceeds to the next stage. When the calculated result of an irregular value continues for more than a predetermined number of times with respect to the set threshold value, a display can be provided indicating that any of photoconductor 10, corona charger 11, Vg generation unit 221 and V sensor 207 is defective. The above calculated result can be reset automatically by exchanging photoconductor 10, the developer, AIDC sensor 214, V sensor 207, and the like, or by reset button 206.

Figure 30:
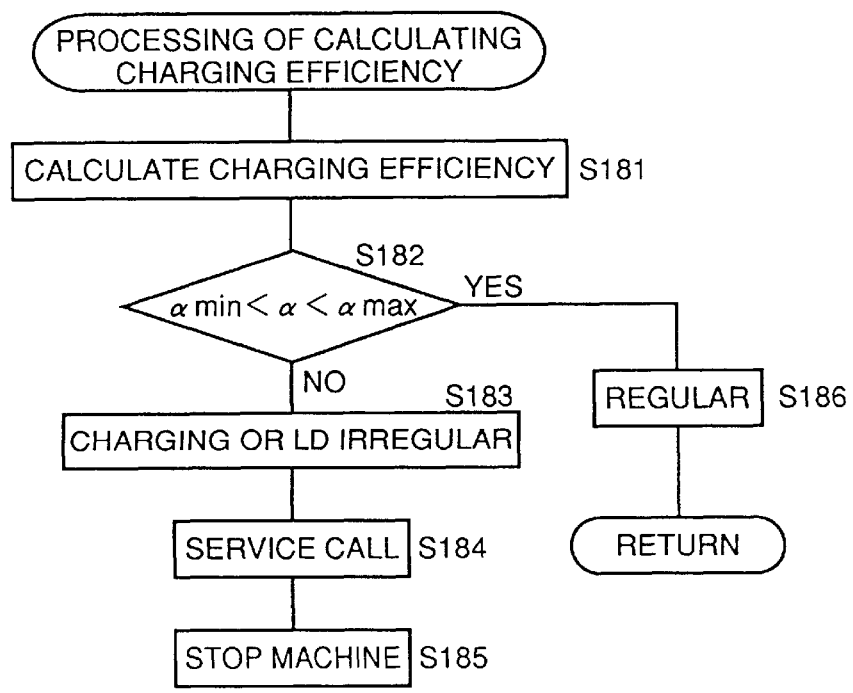
FIG. 30 is a flow chart for describing a charging efficiency calculation process.
Figure 31:
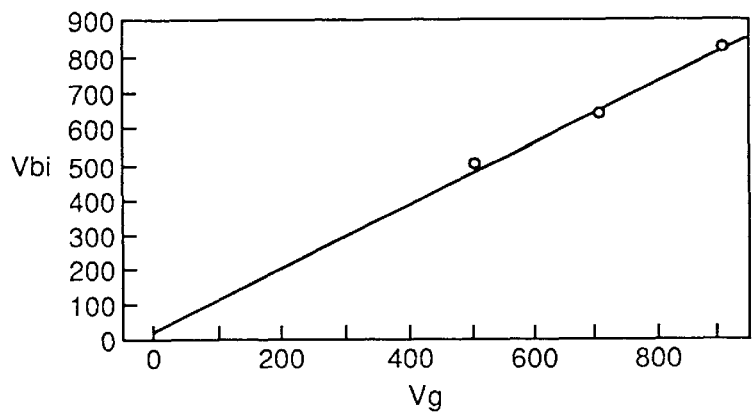
FIG. 31 shows the relationship between surface potential and grid potential.
Figure 32:
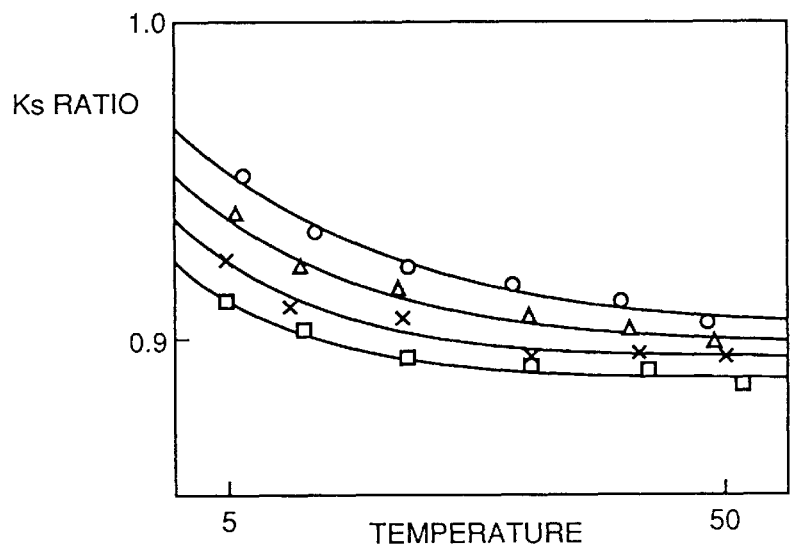
FIG. 32 shows the relationship between temperature and Ks ratio at each development device position.
Figure 33:
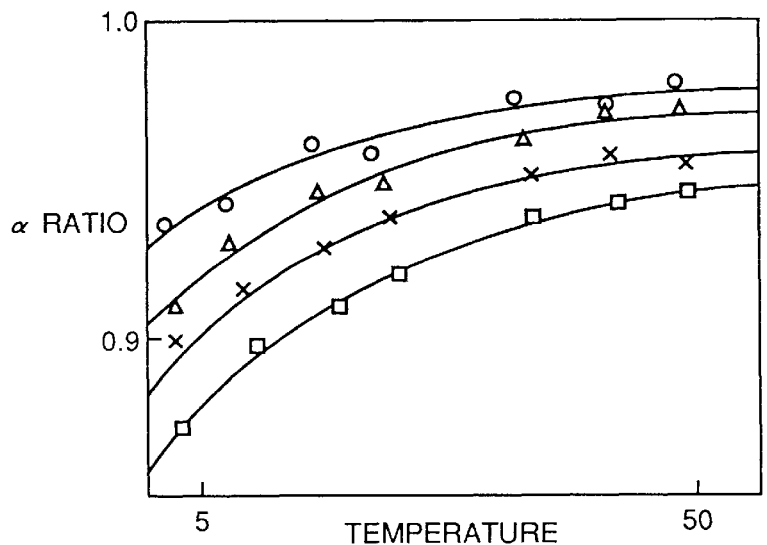
FIG. 33 shows the relationship between temperature and α ratio at each development device position.
Figure 34:
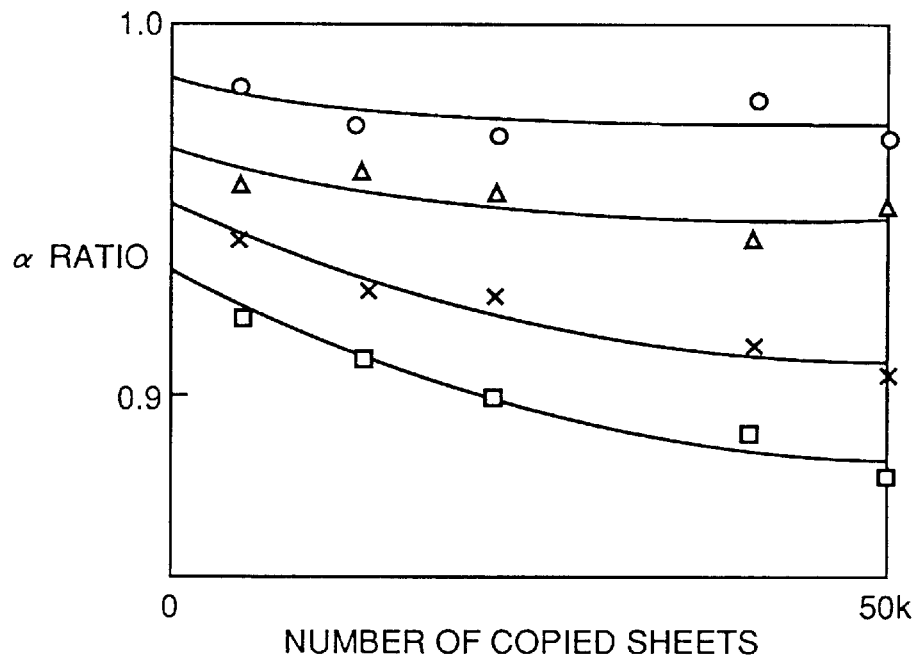
FIG. 34 shows the relationship between the number of prints and α ratio at each development device position.
Figure 35:
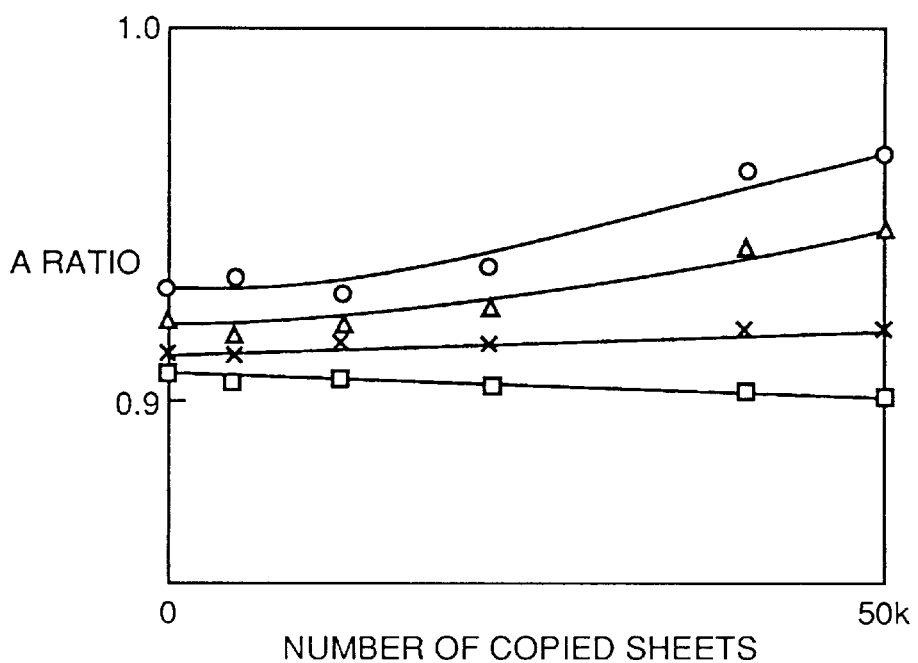
FIG. 35 shows the relationship between the number of prints and A ratio at each development device position.

The charging efficiency calculation process will be described in detail with reference to the flow chart of FIG. 30. At step S181, the charging efficiency calculation process is carried out. More specifically, charging efficiency of photoconductor 10 is calculated using the surface potential detected at step S3. The charging efficiency is required to calculate grid potential Vg to obtain a desired surface potential as described afterwards. The charging efficiency is obtained with the relationship of surface potential Vbi to grid potential Vg taking a linear expression. The linear function essentially includes no intercept or includes potential Vr after erasure as an intercept. However, approximation is achieved by the following equation in a form including an intercept to improve the accuracy in actual usage.

$$Vbi = \alpha \times Vg + \beta \quad (4)$$

where $\alpha$ is the charging efficiency and $\beta$ is an intercept. By the above equation, the relationship between the surface potential and grid potential shown in FIG. 20, for example, can be obtained. $\alpha$ and $\beta$ obtained by the above equation are coefficients at the position of V sensor 207. They are referred to as ($\alpha v$ and $\beta v$ in the following description.

Referring to FIG. 30 again, at step S182, determination is made whether the calculated charging efficiency $\alpha$ is greater than a preset minimum value $\alpha$min and smaller than a maximum value $\alpha$max. When the calculated charging efficiency $\alpha$ is within this range, control proceeds to step S186. Charging efficiency $\alpha$ is regarded to be a proper value, and control proceeds to step S163.

When the above conditions are not satisfied, control proceeds to step S183. Determination is made that there is an error in charging or laser emission. Control proceeds to step S184 to execute a service call process. Then at step S185, the apparatus is turned down.

In the case where the data such as coefficients A, Ks, and charging efficiency $\alpha$ used to produce the emission characteristic data for $\gamma$ correction is not proper, the data can be modified to a predetermined data. Furthermore, it is possible to notify the user that maintenance is required and to turn down the machine. As a result, the event of using the apparatus in an erroneous state can be eliminated. The machine can be always used in a favorable condition.

Also, the following procedure can be taken. Comparison is made with the previous calculated result or initial set value. When the difference or ratio exceeds a set threshold value, the current value is regarded to be an irregular value. Therefore, the previous calculated result or initial set value is employed, and control proceeds to the next stage. A display can be also provided to indicate that any of photoconductor 10, corona charger 11, Vg generation unit 221, and V sensor 207 is defective when an irregular calculated result continues for more than a predetermined number of times with respect to the set threshold value. The calculated result can be reset automatically by exchanging photoconductor 10, developer agent, AIDC sensor 214, V sensor 207, and the like, or by reset button 206.

Referring to FIG. 27 again, at step S163, a photosensitivity characteristic curve of photoconductor 10 at each development position of development devices 12–15 is estimated. Each value obtained in the above process is a coefficient at the position of V sensor 207. Therefore, a coefficient at each development position is calculated by a proportional calculation with respect to the factor of the position of V sensor 207. The sensitivity characteristics of photoconductor 10 at each development position is the only value that cannot be directly calculated in the series of $\gamma$ correction control. This value is calculated according to an empirical rule.

As to the empirical rule, an analysis of variance was carried out by experiments with the environment, film thickness, sheet feed mode, pause mode, beam diameter, and the like as control factors. Those of a high contribution ratio (more than 5%) are stored in data ROM 203 as predetermined data in the format of a look up table for each control factor. Respective ratio of each development position of Av, Ksv, $\alpha v$, $\beta v$ at the position of V sensor 207 can be obtained.

As specific examples, the relationship between temperature and ratio of Ks, the relationship between temperature and ratio of $\alpha$, the relationship between the number of printouts and ratio of $\alpha$, and the relationship between the number of printouts and ratio of A at the position of each development device are shown in FIGS. 32, 33, 34, and 35, respectively. In FIGS. 32–35, ○ indicates data corresponding to the development position of developing device 12, $\Delta$ indicates data corresponding to the development position of developing device 13, × indicates data corresponding to the development position of developing device 14, and □ indicates data corresponding to the development position of development device 15. These data are prestored in data ROM 203 as lookup tables. The sensitivity characteristic of the photoconductor at each development position can be obtained according to the data in the prestored lookup table.

When the photoconductor includes the rotary speed switching function, the sensitivity characteristic of the photoconductor at each development position can be calculated by selecting a correction coefficient of a position corresponding to the achieved time according to a higher or lower speed by speed switching for estimation at the development position. When the print density (resolution) switching function is provided, a correction coefficient according to the print density as described above can be selected.

Figure 36:
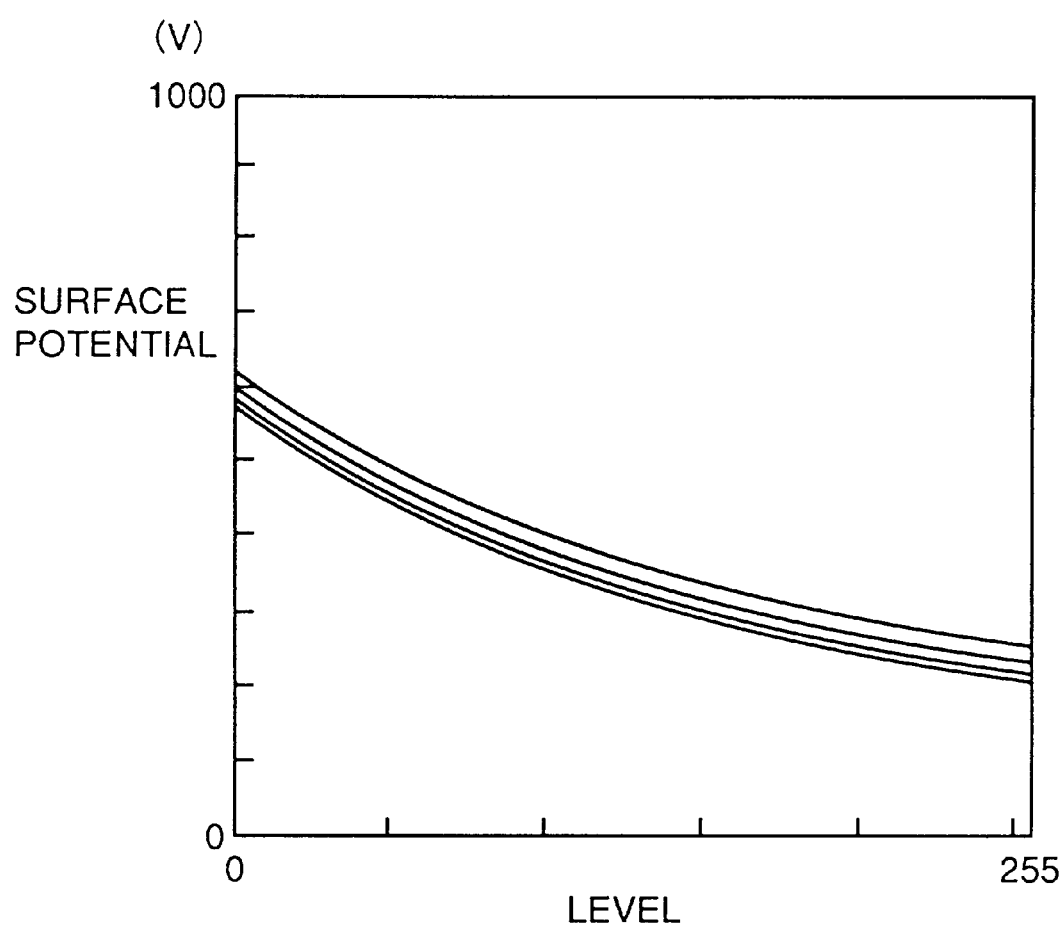
FIG. 36 shows the sensitivity characteristics of a photoconductor at each development position.

FIG. 36 shows the sensitivity characteristic of photoconductor 10 at each development position obtained by the above calculation. In FIG. 36, the uppermost curve indicates the photoconductor sensitivity characteristic at the position of V sensor 207. The following curves indicate the sensitivity characteristic of photoconductor 10 at each development position of development devices 12–15 in this order. By obtaining each coefficient at each development position using each coefficient at the position of V sensor 207, the sensitivity characteristic of photoconductor 10 at each development position can eventually be obtained.

Returning to FIG. 14, at step S5, the quantity of LD power light (maximum exposure in forming an image) is optimized. The LD power light amount can be determined in a one-to-one correspondence according to the conditions of photoconductor 10 independent of the development conditions. The quantity of LD power light Pmax(i) is determined to be approximately 2.5 times the half decay exposure Eh(i) at each development position based on the estimated photoconductor sensitivity characteristic at each development position. The above half decay exposure Eh(i) is the amount of exposure that reduces the potential of photoconductor 10 to ½ when photoconductor 10 charged by a certain potential is exposed at the exposure position and then arrives at each development position.

The quantity of LD power light is calculated according to the following expressions.

$$V = (Vbi - Vr) \times (e^{(-B(i) \cdot Eh(i) \cdot D/Ks(i))} + e^{(-A(i) \cdot Eh(i) \cdot D/Ks(i))})/2 + Vr \quad (5)$$

$$V = (Vbi - Vr)/2 + Vr \quad (6)$$

$$V = (Vbi - Vr) \times (e^{(-A(i) \cdot Eha(i) \cdot D/Ks(i))}) + Vr \quad (7)$$

$$V = (Vbi - Vr) \times (e^{(-B(i) \cdot Ehb(i) \cdot D/Ks(i))}) + Vr \quad (8)$$

$$V = (Vbi - Vr)/2 + Vr \quad (9)$$

In the above expressions, i=1 to 4 (wherein i=1, i=2, i=3, and i=4 indicate yellow developing device 12, magenta developing device 13, cyan developing device 14, and black developing device 15, respectively; Eh(1) to Eh(4) indicate the half decay exposure at each development position of yellow, magenta, cyan, and black; A(1) to A(4), B(1) to B(4), and Ks(1) to Ks(4) indicate each coefficient at each development position). The quantity of LD power light can be calculated by obtaining Eh(i) of expression (5) satisfying expression (6). In order to obtain the value of Eh(i), the values of Eha(i) and Ehb(i) of expressions (7) and (8) satisfying expression (9) are respectively found. Then, the average of these values is taken as Eh(i). Eh(i) times 2.5 is determined to be Pmax(i). More specifically, Pmax(i) is calculated according to the following expression.

$$Pmax(i)=2.5\times(-Ks(i))\times ln(1/2)\times(1/A(i)+1/B(i))/2 \qquad (10)$$

According to the above calculation, the quantity of LD power light Pmax(i) of approximately 2.5 times the half decay exposure at each development position (i=1 to 4) is determined.

When the system speed differs between the time of detection and image formation such as in the case of a higher system speed when a monocolor copy is made, the quantity of LD power light is determined so that the cumulative quantity of light per unit time is equivalent to the quantity of light calculated under the above condition.

Figure 37:
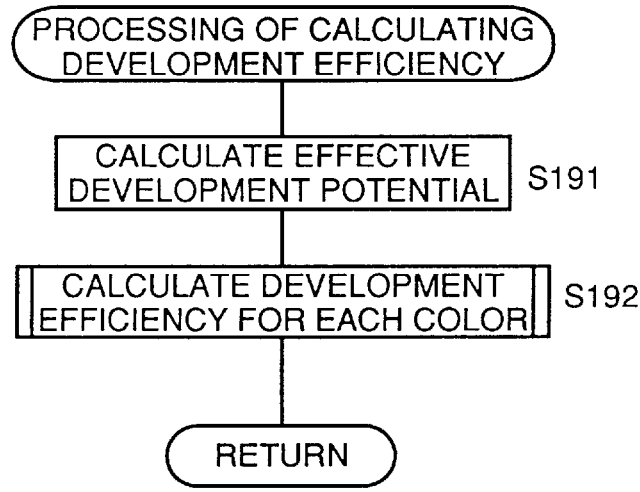
FIG. 37 is a flow chart for describing a development efficiency calculation process.

The process of calculating development efficiency of step S6 in FIG. 14 will now be described in detail with reference to the flow chart of FIG. 37. At step S191, the effective development potential calculation process is carried out.

More specifically, the effective development potentials of the test patterns of 3 gradations x 4 colors (hereinafter referred to as "AIDC pattern") formed at step S2 are obtained. In this invention, the effective development potentials are calculated by input of the condition under which the patterns are formed using the estimated photoconductor sensitivity characteristic at each development position.

First, an average development potential Ve (i, n) is calculated according to the following expression.

$$Ve(i, n) = (Vbi(i) - Vr) \times (Ks(i))/ \qquad (11)$$
$$\{(B(i) - A(i)) \times E(n)\} \times$$
$$(e^{(-B(i)*E(n)*D/Ks(i))} -$$
$$e^{(-A(i)*E(n)*D/Ks(i))}) + Vr$$

Then, the quantity of light C(i) satisfying V(C)=Vb+Vmg at each development position under uniform exposure is calculated according to the following expression.

$$C(i)=Ks(i)\times ln\{(Vbi(i)-Vr)/(Vb(i)+Vmg(i)-Vr)\} \qquad (12)$$

Here, Vmg is a fog potential (development start potential) correction coefficient, having an initial value of 0.

Then, effective development potential ΔVe (i, n) of the AIDC pattern is calculated. The calculation is conducted in three cases, i.e. when the exposure ripple is sufficiently greater than development bias potential Vb, when the exposure ripple overlaps development bias potential Vb, and when the exposure ripple is sufficiently smaller than development bias potential Vb.

When (C(i)/B(i))<E(n)×D (i.e. when the ripple is sufficiently larger than Vb), ΔVe(i, n) is calculated according to the following expression.

$$\Delta Ve(i, n)=Vb(i)+Vmg(i)-Ve(i, n) \qquad (13)$$

When (C(i)/A(i))<E(n)×D<(C(i)/B(i)) (i.e. when the ripple overlaps Vb), ΔVe(i, n) is calculated according to the following expression.

$$\Delta Ve(i, n) = [-1/\{(A(i) - B(i)) \times E(n) \times D\}] \times \qquad (14)$$
$$\{Ks(i) \times (Vbi(i) - Vr) \times$$
$$e^{(-A(i)*E(n)*D/Ks(i))} + (A(i) \times E(n) \times$$
$$D - C(i) - Ks(i)) \times (Vb(i) +$$
$$Vmg(i) - Vr)\}$$

Lastly, when (C(i)/A(i))>E(n)×D (i.e. when the ripple is sufficiently smaller than Vb), ΔVe(i, n) is calculated according to the following expression.

$$\Delta Ve(i, n) = 0 \qquad (15)$$

Referring again to FIG. 37, the process of calculating development efficiency for each color is carried out at step S192. Then, control proceeds to step S7.

Figure 38:
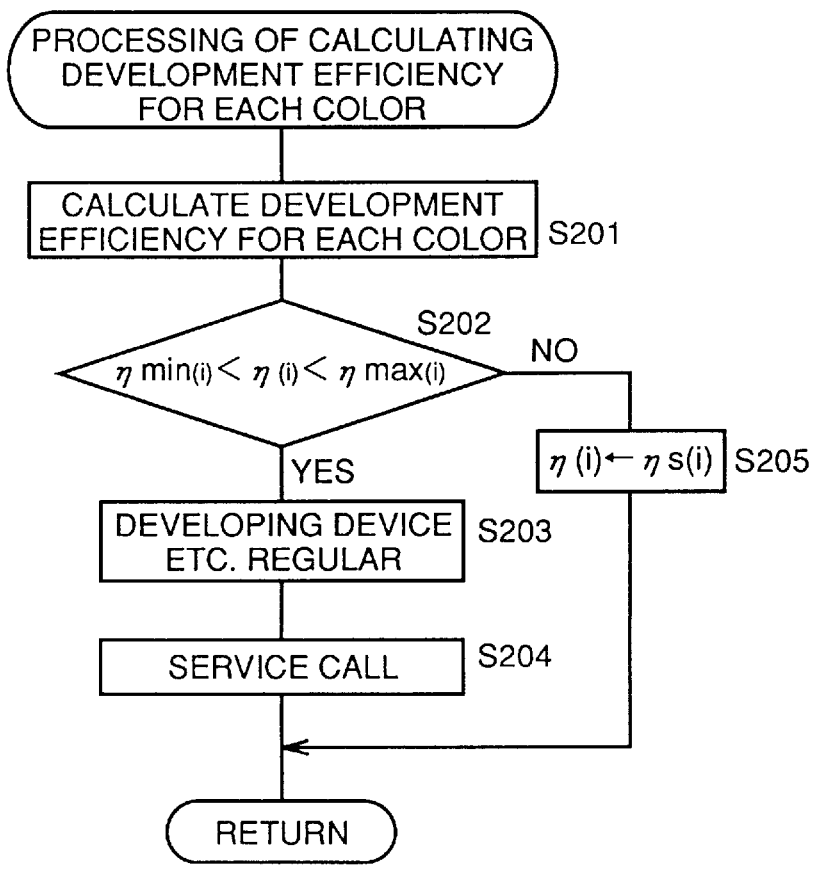
FIG. 38 is a flow chart for describing a development efficiency calculation process of each color.
Figure 39:
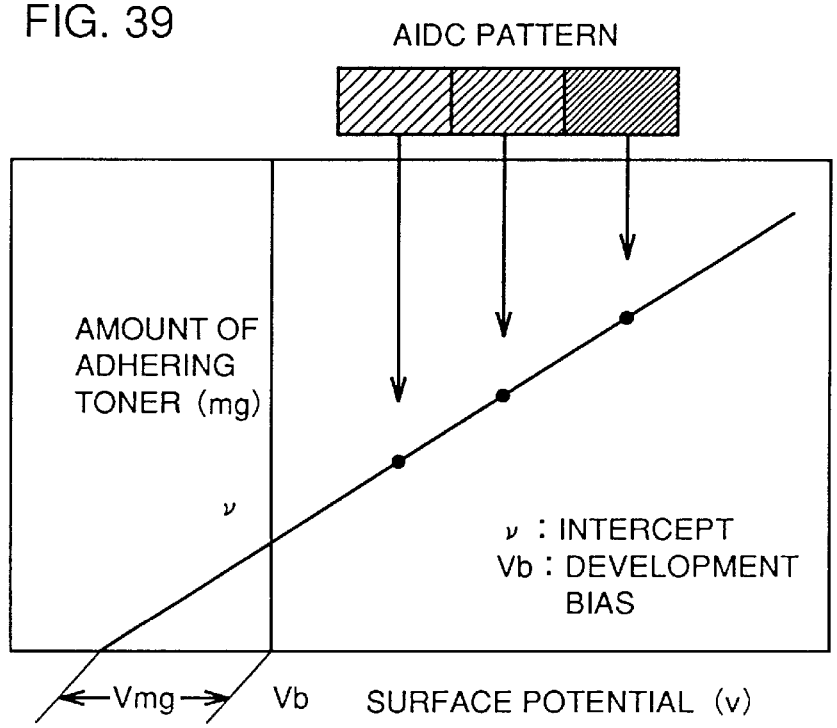
FIG. 39 shows the relationship between surface potential and the amount of toner adherence.

The development efficiency calculation process for each color will be described in detail with reference to the flow chart of FIG. 38. At step S201, the development efficiency calculation process for each color is executed.

More specifically, the development efficiency is calculated from the amount of adhering toner obtained at step S2 and the above calculated effective development potential. The relationship between the amount of adhering toner and the effective development potential is approximated in a linear expression. The slope and intercept are obtained. This slope is the development efficiency. Although the intercept of the linear expression should be 0, the intercept will include some value since the fog phenomenon does not necessarily occur from the level of development bias potential Vb. Therefore, the intercept is used as a fog potential correction coefficient Vmg.

In practice, fog potential correction coefficient Vmg is calculated from the slope (development efficiency η(i)) and the intercept (v(i)). FIG. 15 shows the relationship between the surface potential and the amount of adhering toner. As shown in FIG. 15, fog potential correction coefficient Vmg (i) can be calculated according to the following expression.

$$Vmg(i)=v(i)/\eta(i) \qquad (16)$$

By recalculating the above described effective development potential using this obtained Vmg(i), a development efficiency can be calculated with no intercept (v(i)=0).

Also, an adjustment key for adjusting the fog potential manually can be provided at operation panel 205. In this case, the service personnel can correct the fog potential manually.

Referring to FIG. 38 again, at step S202, determination is made whether the calculated development efficiency η(i) is greater than the minimum value ηmin(i) set for each color and smaller than maximum value ηmax(i). When these conditions are satisfied, control proceeds to step S203, otherwise to step S205. When the calculated value is within the above range, determination is made that the development device and the like are proper at step S203. Then, control proceeds to step S7.

When the condition of step S202 is not satisfied, control proceeds to step S205 where development efficiency η(i) is altered to a predetermined value ηs(i). Then, control proceeds to step S7. The value of ηs(i) used here is the previously calculated value or a predetermined set value.

When the difference or ratio as a result of comparison with the previous calculated result or initial set value differs and exceeds a set threshold value, that value is regarded to be irregular. The previous calculated result or initial set value is employed. Then, control proceeds to the next process. When an irregular calculated result continues for more than a predetermined number of times and each calculated coefficient for photoconductor 10 is proper, a display can be provided indicating error in any of Vb generation unit 213, development devices 12–15, and AIDC sensor 214. The calculated result can be automatically reset when photoconductor 10, developer agent, AIDC sensor 214, V sensor 207, and the like is exchanged, or by a reset button 206.

Figure 40:
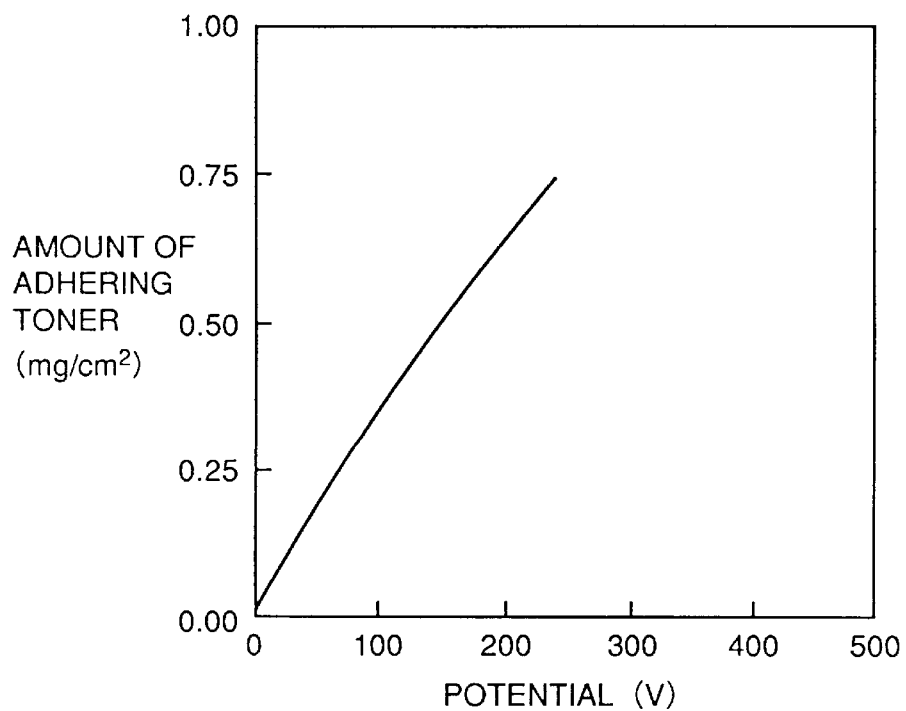
FIG. 40 shows an example of a development characteristic curve.

At step S7 of FIG. 14, effective development potential ΔVe required for each color is calculated. First, a development characteristic curve is approximated. Although the development characteristic should be linear (the potential and adherence amount have a linear relationship), there may be a case where the development characteristic is not linear when a large amount of toner adheres under conditions such as low temperature and low humidity, low T/C (the case where the toner content with respect to carrier is low). In the present embodiment, the development characteristic curve of each color is approximated with the higher adherence side slightly attenuated using the development efficiency obtained by the process of calculating the development efficiency of each color as described above. FIG. 40 shows an example of a development characteristic curve obtained by such a process.

Figures 43, 44, 45:
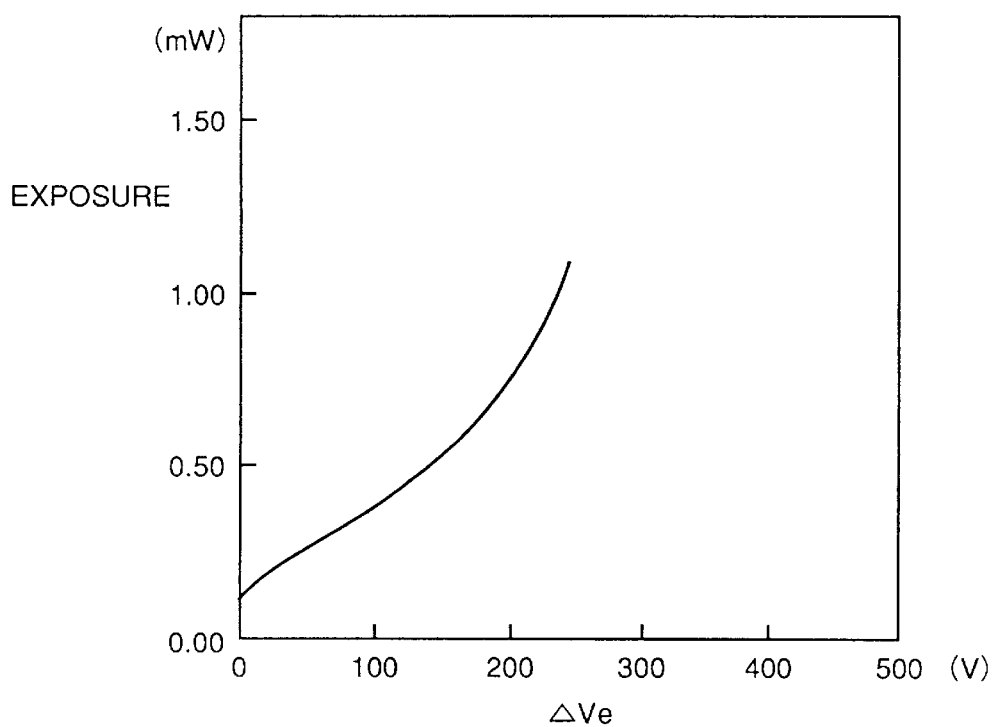
FIG. 43 shows a transfer efficiency coefficient with respect to the type of sheets.
FIG. 44 shows a transfer efficiency coefficient with respect to the total number of copies allowed by the machine.
FIG. 45 shows the relationship between the amount of exposure and effective development potential.

Next, according to the LD power light amount obtained at step S5 and the development characteristic curve obtained by the above process, effective development potential ΔVe required for each color is calculated to obtain the desired maximum amount of adherence (maximum density). First, the transfer characteristic is estimated and calculated to convert the desired maximum amount of adherence into a value of amount on a transfer material. The transfer characteristic can be estimated by applying correction according to at least one information of the humidity information from environment sensor 209, the transfer material information from operation panel 205, and the counter information from development device drive counter 210 using a predetermined coefficient prestored in data ROM 203. FIG. 41 shows the relationship of the amount of toner transferred onto a transfer sheet and the amount of residue toner left on photoconductor 10. FIG. 42 shows coefficients with respect to absolute temperature. FIG. 43 shows coefficients with respect to the type of sheet. FIG. 44 shows coefficients with respect to the total number of copies allowed by the machine. In the above correction process, at least one of the information shown in FIGS. 41–44 is used.

In the present embodiment, the target amount of adherence on a sheet is set as 0.7 mg/cm². The toner residue amount ($R_{0.7}$) on photoconductor 10 when the toner adherence amount on photoconductor 10 is 0.7 mg/cm² is read out from FIG. 41. According to environment information input from environment sensor 209, transfer material information from operation panel 205, and counter information from photoconductor drive counter 210, transfer efficiency coefficients d1, d2 and d3 corresponding to each information shown in FIGS. 42–44, for example, are read out. Effective development potential $\Delta Ve_{(255)}$ required for each color is calculated using the following equation.

$$\Delta Ve_{(255)} = (0.7 + R_{0.7} \times d1 \times d2 \times d3)/\eta(i) \qquad (17)$$

At step S8, grid potential Vg and development bias potential Vb which are image forming parameters are determined. More specifically, the approximate expression of the photoconductor sensitivity characteristic at each development position obtained at step S163 of FIG. 8 is first counted back to calculate development bias potential Vb for each color for satisfying effective development potential ΔVe required for each color obtained by the above described process. At this time, the fog potential correction coefficient calculated by the above processing of calculating development efficiency is also taken into account.

A set fog margin is added to the calculated development bias potential Vb, which is set as surface potential Vbi for each color. Grid potential Vg to obtain this Vbi is calculated using the charging efficiency obtained at step S181. If either Vg or Vbi exceeds a grid potential range or a development bias potential range that can be set, a value which is closest to the set range is set. The other of Vg and Vb is recalculated according to that set value (Vb +fog margin or Vbi–fog margin).

At step S9, a potential for correction for a multi-copy operation mode is calculated. More specifically, a potential for correcting sensitivity change during the multi-copying operation is calculated. If the charging efficiency does not substantially change during the multi-copying operation, a change in the latent image forming system is considered to arise from sensitivity variation of photoconductor 10. Since the quantity of LD power light is determined by the sensitivity of the photoconductor, the sensitivity change can be corrected by being standardized with the exposure amount and potential. When the exposure and potential are to be standardized geometrically, they may be standardized with the maximum or minimum value. However, since the half tone part where the sensitivity is high has a greater impact on an image, standardization is carried out in the vicinity of the half decay exposure or at a certain gradation tone. More specifically, the quantity of LD power light is fed back so that the potential at that gradation level is always kept constant. Since the actual detection is conducted by V sensor 207, it is assumed that the potential at the development position is corrected if the potential at the position of V sensor 207 is corrected.

More specifically, potential V1 at the time of emitting exposure amount E1 can be calculated by the following equation using D__A, D__B, E(E1) shown afterwards.

$$V1 = (Vbi - Vr) \times (e^{(-D\_B \times E(E1)/Ksv)} + e^{(-D\_A \times E(E1)/Ksv)})/2 + Vr \qquad (18)$$

This is the potential of emitting exposure E1 in forming a γ correction curve.

At step S10, the γ characteristic at linear light emission is estimated. First, light amount divided into 255 from bias light amount to the set LD power light amount is obtained. The four subdivided small pixels in one pixel shown in FIG. 6 are labeled pixel D__0, pixel D__1, pixel D__2, and pixel D__3. The increase ratio for the desired calculation tone n of functions D__$_E$0(n), D__E1(n), D__E2(n), and D__E3(n) assigned respectively to the four subdivided small pixels is set as D__0A, D__1A, D__2A, and D__3A, respectively. The offset value is set as D__0B, D__1B, D__2B, and D__3B, respectively. Functions D__E0(n), D__E1(n), D__E2(n), and D__$_E$3(n) are obtained by the following equations (19) to (22).

$$D\_E0(n) = D\_0A \times (n - D\_0B) \qquad (19)$$

$$D\_E1(n) = D\_1A \times (n - D\_1B) \qquad (20)$$

$$D\_E2(n) = D\_2A \times (n - D\_2B) \qquad (21)$$

$$D\_E3(n) = D\_3A \times (n - D\_3B) \qquad (22)$$

When the division of each pixel is generalized as m+1, j is an integer of 0~m, the maximum modulation allowable light amount is Pmax, and the minimum bias light amount is Pbias, the accumulated light amount E(n) of a pixel of interest is obtained by the following equation (23).

$$E(n) = (Pmax - Pbias)/m \sum_{j=0}^{m} (D\_Ej(n)/255) + Pbias \quad (23)$$

Next, effective development potential ΔV is obtained as set forth in the following for each gradation tone.

First, the ratio of the pixel of interest to the accumulated light amount of each small pixel is obtained for each tone level. Accordingly, the configuration of the light emission pattern is determined. When the ratio of the small pixel of interest to the accumulated light amount is D_jSTD(n), the following equation is obtained.

$$D\_jSTD(n) = (D\__{Ej}(n) \times ((Pmax-Pbias)/255))/(E(n) \times 4) \quad (24)$$

Then, the maximum value Q(n) and the minimum value P(n) of the light amount distribution function on photoconductor 10 determined by the light emission pattern are obtained by the following equations (25) and (26), respectively.

$$P(n) = (D\_0STD(n) + (D\_1STD(n) - D\_2STD(n))/3.5 + \quad (25)$$
$$(D\_2STD(n) - (D\_1STD(n))/30) \times 4.0555$$

$$Q(n) = P(n) - 0.9578 + 1.8889 \times \{2 \times (D\_1STD(n) - D\_0STD(n)) + \quad (26)$$
$$(D\_2STD(n) - D\_1STD(n)) + (D\_2STD(n) - D\_0STD(n)) +$$
$$(D\_3STD(n) - D\_2STD(n)) + (D\_3STD(n) - D\_1STD(n))\}$$

The equations shown in the present embodiment are only a way of example, and a similar effect can be obtained by other coefficients. Accordingly, a coefficient of the light amount distribution function in the main scanning direction can be obtained.

The maximum value and the minimum value of the light amount distribution function in the sub scanning direction are already obtained as A and B at step S4. Therefore, the main and sub maximum values and minimum values can be obtained by multiplying these values.

When the maximum value and the minimum value of the light distribution on photoconductor 10 are D_A and D_B, respectively, and the diffusion coefficient is τ, the effective development potential for 256 tone levels can be obtained by the following equations of (27)–(33).

$$D\_A(1\sim4)(n) = A(1\sim4) * Q\_(n) \times \tau \quad (27)$$

$$D\_B(1\sim4)(n) = B(1\sim4) * P(n) \times \tau \quad (28)$$

$$Ve(n)(1\sim4) = (Vbias(1\sim4) - VR) \times (KS(1\sim4)/[D\_B(1\sim4)(n) - \quad (29)$$
$$D\_A(1\sim4)(n)) \times E(n)] \times (e^{(-D\_B(1\sim4)(n) \times E(n)/KS(1\sim4))} -$$
$$e^{(-D\_A(1\sim4)(n) \cdot E(n)/KS(1\sim4))}) + VR$$

$$C(1\sim4) = KS(1\sim4) \times \ln[(Vbias(1\sim4) - VR)/VB(1\sim4) + \quad (30)$$
$$VMG(1\sim4) - VR)] \cdot$$
$$(C(1\sim4)/D\_B(1\sim4)(n)) < E(n)$$

when (sufficiently greater than VB)

$$\Delta Ve(1\sim4, n) = (VB(1\sim4) + VMG(1\sim4) - Ve(1\sim4, n))/ \quad (31)$$

$$(D\_A(1\sim4) + D\_B(1\sim4)) \times 2)\cdot$$
$$(C(1\sim4)/D\_A(1\sim4)(n)) < E(n) < (C(1\sim4)/D\_B(1\sim4)(n))$$

when (spanning VB)

$$\Delta Ve(1\sim4, n) = \{[-1/\{((D\_A(1\sim4)(n) - D\_B(1\sim4)(n)) \times E(n)\}] \times \quad (32)$$
$$[KS(1\sim4) \times (Vbias(1\sim4) - VR) \times$$
$$e^{(-D\_A(1\sim4)(n) \times E(n)/KS(1\sim4))} + (D\_A(1\sim4)(n) \times E(n) - C(1\sim4) -$$
$$KS(1\sim4)) \times (VB(1\sim4) + VMG(1\sim4) - VR)]\}/(D\_A(1\sim4) +$$
$$D\_B(1\sim4)) \times 2\cdot$$
$$(C(1\sim4)/D\_A(1\sim4)(n)) > E(n)$$

when (sufficiently smaller than VB)

$$\Delta Ve(1\sim4, n) = 0 \quad (33)$$

The relationship between the exposure amount and effective development potential ΔVe obtained here is as shown in, for example, FIG. 45.

Figure 46:
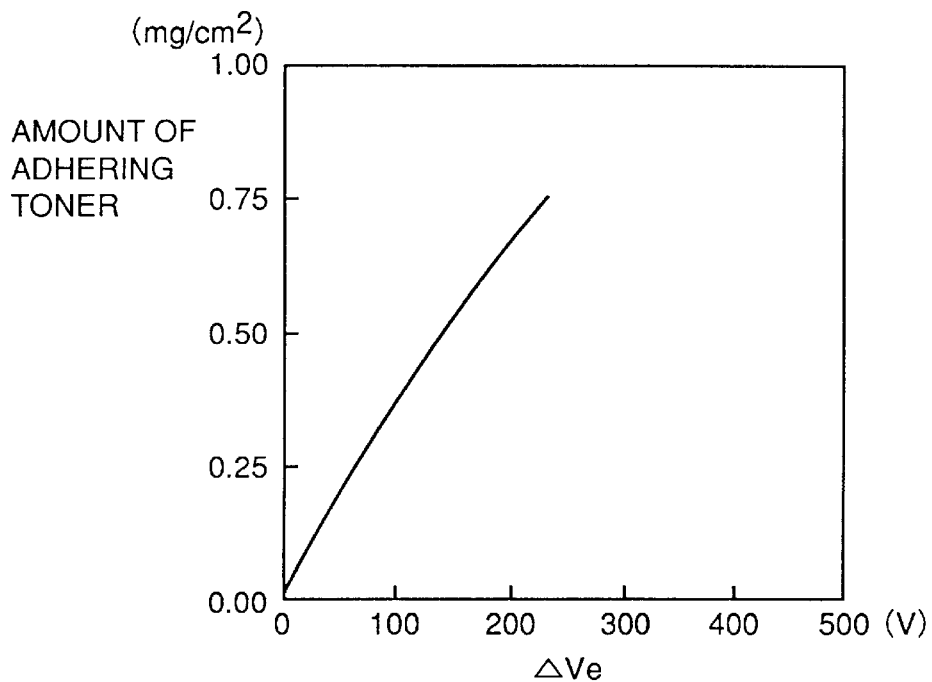
FIG. 46 shows the relationship between the amount of toner adhering on a photoconductor and effective development potential.

The toner adherence amount on photoconductor 10 is obtained for each effective development potential ΔVe using the development efficiency. The relationship between effective development potential ΔVe and the toner adherence amount on photoconductor 10 is, for example, as shown in FIG. 46.

Then, the estimated transfer residue amount is subtracted from the toner adherence amount on photoconductor 10 to obtain the adherence amount on the sheet. The estimated transfer residue amount is already stored in a lookup table, and fed back by the information of environment sensor 209. The adherence amount on a sheet is represented by the following equation:

$$PT(n, i) = PA(n, i) - R(n) \times d1 \times d2 \times d3 \quad (34)$$

where PT(n, i) is the adherence amount on a sheet, and PA(n, i) is the amount of toner adhering on photoconductor 10.

Figure 47:
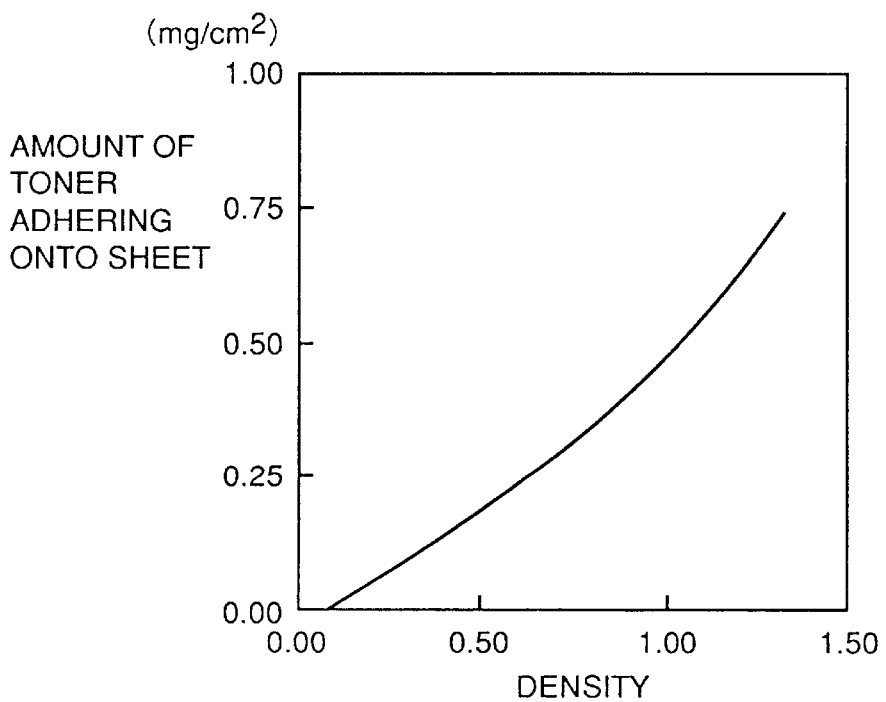
FIG. 47 shows the relationship between the amount of toner adhering on a sheet and density.
Figure 48:
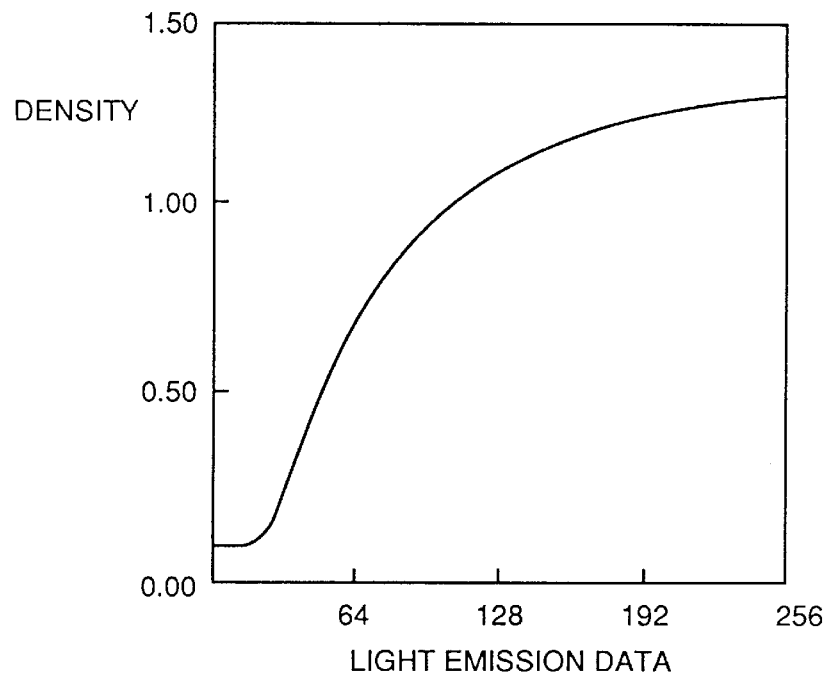
FIG. 48 shows a γ correction characteristic curve.

Then, the relationship between the amount of adherence on the sheet and the density is obtained according to the toner characteristic. An estimated characteristic is prestored in a lookup table. For example, the relationship between the amount of adherence on a sheet and density shown in FIG. 47 is stored. By obtaining the density on a sheet using this lookup table, density for 256 tone levels can be calculated. As a result, a γ characteristic curve as shown in FIG. 48, for example, can be obtained.

At step S11, a γ correction light emission characteristic data is generated using the γ characteristic curve obtained as described above. In this calculation, when the γ characteristic curve is to be linear, the γ correction light emission characteristic data to be calculated can be obtained by the X-Y axis conversion of the γ characteristic curve.

Figure 49:
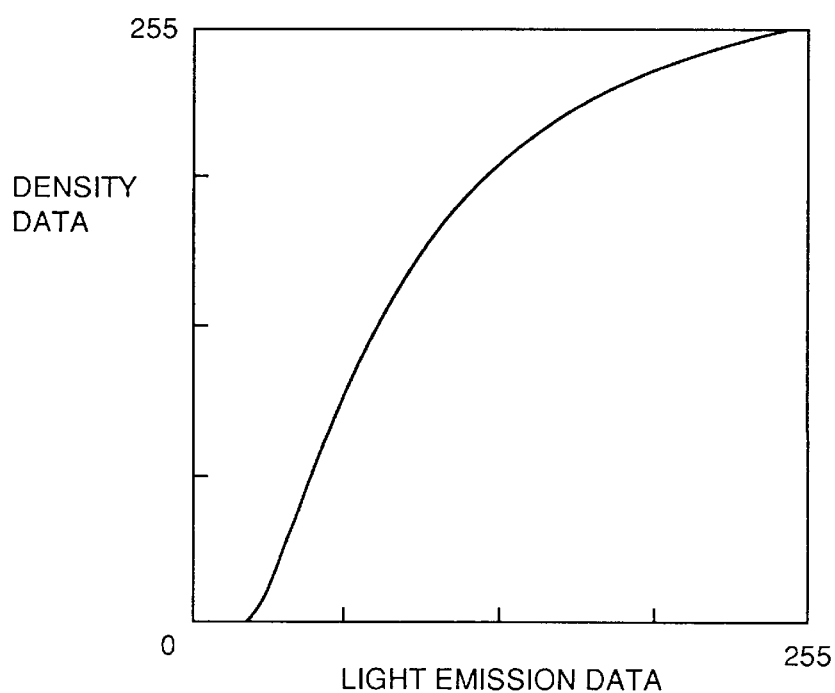
FIG. 49 shows the relationship between density data and light emission data.

The γ characteristic curve obtained at step S10 is standardized by 8 bits between the target density level (the density of the target adherence amount) and level 0. When the maximum density of the γ characteristic curve does not reach the target density, the gain for standardization is adjusted according to this insufficiency. As a result, the density data and light emission data as shown in, for example FIG. 49, can be obtained.

Figure 50:
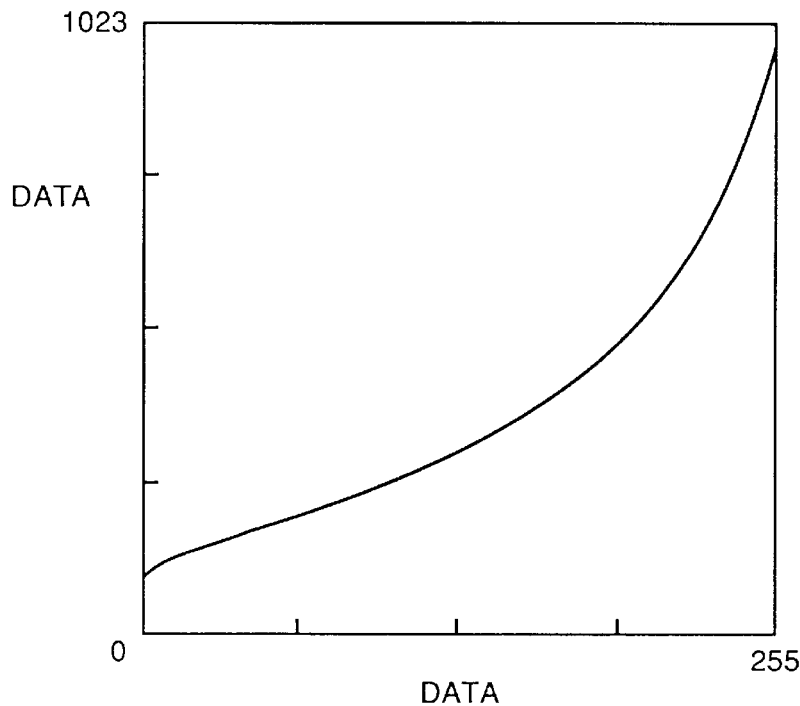
FIG. 50 shows data that is converted in the X-Y axis.
Figure 51:
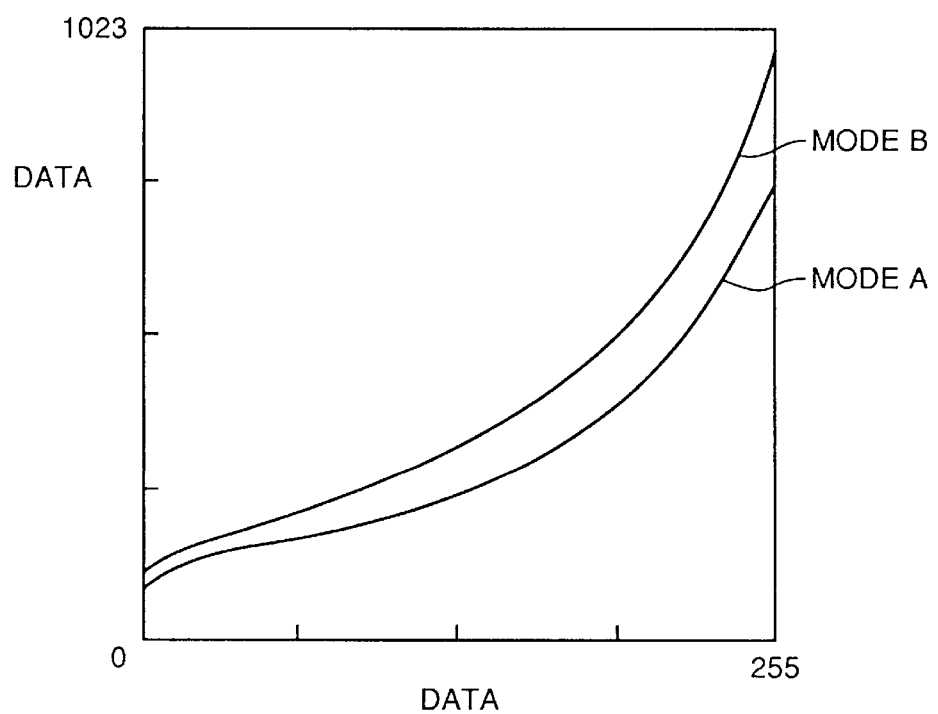
FIG. 51 shows data converted by the X-Y axis with respect to two modes.
Figure 55B:
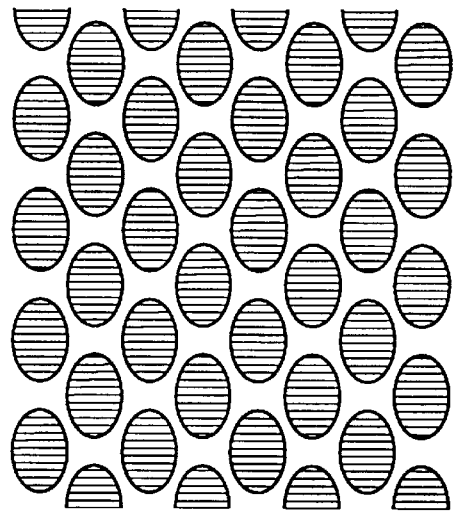
FIGS. 55A–55D show an obtained dot pattern.
Figure 55D:
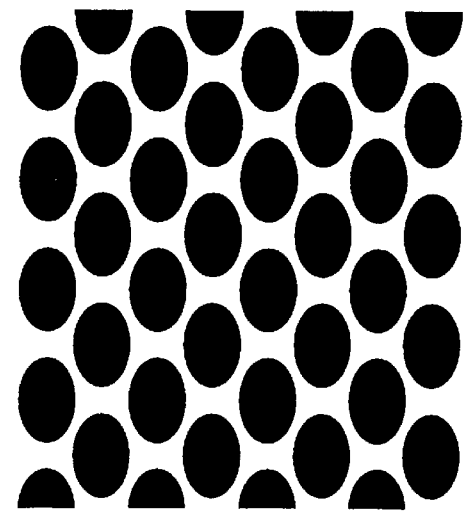
Figure 55A:
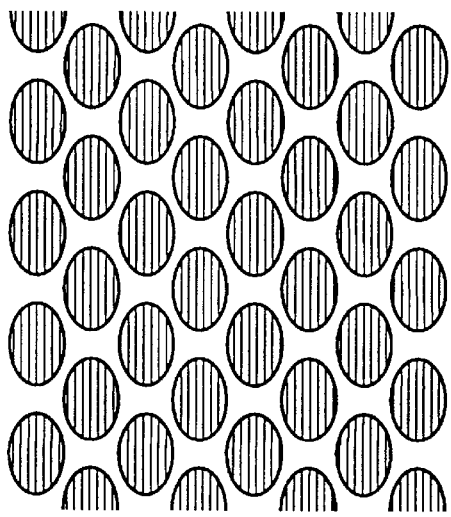
Figure 55C:
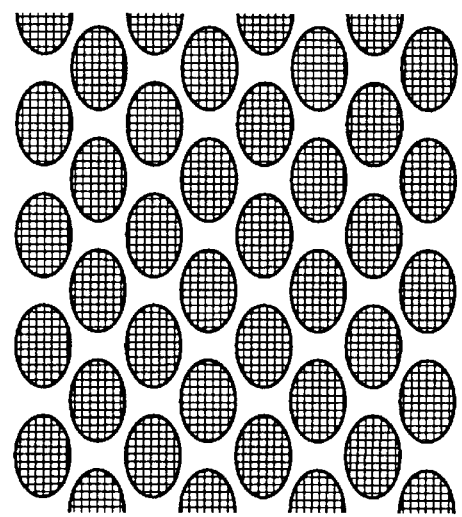

The 8-bit data is converted into 10 bits (4 times), and the X-Y axis conversion is carried out. Then, the missing portion of data is linearly compensated for. As a result, the data shown in FIG. 50 is obtained.

Finally, the obtained data is subjected to a smoothing process using a moving average filter. As a result, γ correction light emission characteristic data is generated to convert the γ characteristic curve generated at step S10 linearly.

In the present embodiment, it is also possible to generate γ correction light emission characteristic data for a plurality of different light emission patterns. By defining at least two types of the parameters D_0A, D_1A, D_2A, D_3A, D_0B, D_1B, D_2B, D_3B of the function that determines the light emission pattern for each one color, two types of γ correction light emission characteristic data of a mode A in which all the small subpixels in one pixel emit light at the same exposure amount and a mode B where the small subpixels emit light in a mountain configuration.

Referring to FIG. 14 again, a print key is input at step S12. At step S13, determination is made whether the print switch is turned on or not. When the print switch is turned on, control proceeds to step S14, otherwise to step S12. At step S14, an image formation process for each color is carried out. At step S15, confirmation is made whether the copy operation is ended or not. When copy is not yet ended, control proceeds to step S14, otherwise to step S2 to repeat the following processes.

By the above-described process, optimum image formation parameter and γ correction light emission characteristic data can be obtained by calculation. Therefore, a favorable image can be formed.

Although the present embodiment was described in which the present invention is applied to a digital full color copying machine, the present invention is also applicable to a printer that generates an image according to image data from a digital camera, a CD software, and the like.

Second Embodiment

The second embodiment of the present invention differs from the first embodiment in that a plurality of function arrangement parameters are used. More specifically, instead of the function arrangement parameter of FIG. 6, an odd numbered line function arrangement parameter and an even numbered line function arrangement parameter are used for the 4 colors of cyan, magenta, yellow, and black as shown in FIGS. 52A–52H. Similar to the first embodiment, a linear function of FIG. 5 that has a slope differing from each other is used.

The function arrangement parameters for the odd and even numbered lines for cyan are set at the cycle of two pixels and with opposite phases of frequency between an odd numbered line and an even numbered line. In general, a first function arrangement parameter determining the arrangement of the function in the main scanning direction at a cycle of a predetermined number of dots N (in the present embodiment, N=2), and a second function arrangement parameter having the function arrangement shifted by N/2 dots from the first parameter are stored. A function process is carried out switching between the first and second parameters for every 1 line.

In the present embodiment, the function arrangement parameters for the odd and even numbered lines of black are set similar to the function arrangement parameters of the even and odd numbered lines of other colors.

The input image data is subjected to a function process by an odd numbered line function arrangement parameter and an even numbered line function arrangement parameter according to whether the line of that data is an odd numbered line or an even numbered line. Data subjected to a function process is obtained for each line. Similar to FIG. 6 of the first embodiment, the function arrangement parameter is set at the cycle of 2 pixels.

FIGS. 53A–53D show examples of the correspondence of clock, function arrangement parameter, input image data, and image data subjected to function process (exposure data) for an odd numbered line in cyan. The clock is a signal of a frequency 4 times the modulation frequency. The function arrangement parameter is set at the cycle of 2 pixels as shown in FIG. 6. The input image data is subjected to a function process by the function arrangement parameter. The function-processed image data at the bottom is obtained. Light emission intensity of semiconductor laser 120 is modulated according to the image data subjected to a function process. The duty ratio is 75%.

Similarly, FIGS. 54A–54D show examples of the correspondence of clock, function arrangement parameter, input image data, and function-processed image data (exposure data) for an even numbered line in cyan.

Upon detection of initiating scanning of the first scanning line by SOS sensor 128 of FIG. 3, the data is subjected to a function process by the odd numbered line function arrangement parameter of cyan provided from drive I/O 310 and parallel I/O 311 of FIG. 4. Following exposure data conversion, scanning of the first line is initiated according to the obtained predetermined light intensity and clock signal. When SOS sensor 128 detects a scan start signal for the second scanning line, the data is subjected to a function process by an even numbered line function arrangement parameter of cyan. The second line is scanned according to a predetermined light intensity and clock signal obtained after exposure data conversion. Thereafter, the third, fifth, seventh, . . ., (2n−1)th (where n is a natural number) lines and the second, fourth, eighth, (2n)th lines are scanned according to exposure data subjected to a function process according to an odd numbered line function arrangement parameter and an even numbered line function arrangement parameter, respectively, to form a latent image within the valid image area.

A similar operation is carried out for magenta, yellow, and black. That is to say, scanning is carried out according to exposure data subjected to a function process using an odd numbered line function arrangement parameter and an even numbered line function arrangement parameter for each color to form a latent image in the valid image area.

FIGS. 55A–55D show examples of the dot patterns of cyan, magenta, yellow, and black having an image formed at the cycle of 2 dots. In the present embodiment, the dot formation position of the odd numbered and even numbered lines for cyan, magenta, yellow, for example are made identical. In forming an image in black, the non-light emission portion is kept from overlapping the non-light emission portion of other colors.

The operation of carrying out a function process according to a function process parameter corresponding to the odd numbered area and even numbered area of sub scanning lines to form a dot angle of 45 degrees for each color at the obtained predetermined light intensity can also be applied in forming an image in a single color. In this case, the process of read out, latent image formation by laser exposure, image formation, and transfer is carried out only once for a predetermined single color.

According to the above process, control is allowed at an exposure intensity obtained by a function set for each subdivided small pixel in the present embodiment. A peak can be established in the exposure data to allow formation of a deeper latent image. Particularly, the graininess in the highlight area to the halftone area is improved significantly. By using the functions and function arrangement parameters shown in FIGS. 4 and 52, a favorable image less affected by overshooting/undershooting of the laser can be formed even when a semiconductor laser of inferior response is used.

By setting the organization of the odd numbered line and even numbered line function arrangement parameters of black identical to those of the even numbered line and odd numbered line function arrangement parameters, respectively, of other colors, a dot can be formed so that the non-light emission area does not overlap the non-light emission area of other colors when an image is formed in black. Since the dot formation timing of black can be shifted by 1 dot period from other colors, the color moire phenomenon can be reduced in the overlay of 4 colors. Color moire is caused mainly by period deviation in the reproduced position of each color dot. Moire can be prevented effectively by covering the non-dot formed area with another color so that the extruding color is not visible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation apparatus exposing a photoconductor according to image density data of each pixel in an original to form an image on said photoconductor, comprising:

light emission means to divide a pixel region corresponding to one pixel in said original on said photoconductor into first to Nth (N is a natural number of at least 2) small pixel regions for sequentially exposing each of said first to Nth small pixel regions, memory means for storing first to Nth functions with said image density data as a parameter, exposure amount calculation means for calculating respective exposure amounts of said first to Nth small pixel regions according to image density data of each pixel in said original and said first to Nth functions read out from said memory means, and control means for controlling light emission intensity of said light emission means according to a calculated result of said exposure amount calculation means.

2. The image formation apparatus according to claim 1, wherein said first to Nth functions are linear functions having at least one of a slope and an intercept differing from each other.

3. The image formation apparatus according to claim 1, wherein said exposure amount calculation means calculates the exposure amount of said first to Nth small pixel regions in a pixel region corresponding to one of two adjacent pixels in said original according to image density data of said one of the two adjacent pixels and said first to Nth functions read out from said memory means, and calculating the exposure amount of the first to Nth small pixel regions of a pixel region corresponding to the other of the two adjacent pixels according to image density data of said other of the two adjacent pixels and said Nth to first functions read out from said memory means.

4. The image formation apparatus according to claim 3, wherein said exposure amount calculation means calculates the exposure amount of the first to Nth small pixel regions of a pixel region corresponding to one of two adjacent pixels in said original according to image density data of said one of the two adjacent pixels and said Nth to first functions read out from said memory means, and calculating the exposure amount of the first to Nth small pixel regions of a pixel region corresponding to said other of the two adjacent pixels according to image density data of said other of the two pixels and first to Nth functions read out from said memory means, when said image density data is density data of a predetermined color.

5. The image formation apparatus according to claim 1, further comprising:

setting means for setting an image formation parameter to an optimum value to form an image of said original, data calculation means for calculating the relationship between said image density data and an exposure amount of a pixel region corresponding to one pixel in said original on said photoconductor according to said first to Nth functions read out from said memory means, and calculating $\gamma$ correction data to obtain a desired gradation tone characteristic according to a calculated result and the image formation parameter set in said setting means, and correction means for correcting said image density data of each pixel in said original according to the $\gamma$ correction data calculated by said data calculation means to provide said corrected image density data to said exposure amount calculation means as said image density data of each pixel in said original.

6. An image formation apparatus exposing a photoconductor according to image density data of each pixel in an original to form an image on said photoconductor, comprising:

light emission means to divide a pixel region corresponding to one pixel in said original on said photoconductor into a plurality of small pixel regions for sequentially exposing each of said plurality of small pixel regions, memory means for storing plural functions with said image density data as a parameter, exposure amount calculation means for calculating respective exposure amount of said plurality of small pixel regions according to corresponding image density data of each pixel in said original and said plural functions read out from said memory means, an exposure amount of one of said small pixel region being calculated according to one of said plural functions and adjacent small pixel region being calculated according to different functions, and control means for controlling light emission intensity of said light emission means according to a calculated result of said exposure amount calculation means.

7. An image reproducing apparatus for reproducing an image based on image density data, said image reproducing apparatus comprising:

an imaging element; and a controller which converts the image density data corresponding to a pixel into a plurality of drive data by using a plurality of parameters, each of the drive data defining a density, said controller driving said imaging element based on the plurality of drive data to reproduce a part of the image corresponding to the pixel.

8. The image reproducing apparatus according to claim 7, wherein said parameters are functions.

9. The image reproducing apparatus according to claim 8, wherein said controller comprises a memory which stores the functions.

10. The image reproducing apparatus according to claim 8, wherein the functions are different from each other.

11. The image reproducing apparatus according to claim 7, wherein said imaging element emits a light signal.

12. The image reproducing apparatus according to claim 11, wherein said imaging element is a laser diode.

13. A method for reproducing an image based on image density data of a plurality of pixels, said method comprising the steps of:

(a) defining a plurality of drive data corresponding to density data for a pixel by using a plurality of parameters, each of the drive data defining a density; and (b) driving an imaging element a plurality of times based on the plurality of driving data to reproduce a part of the image corresponding to the pixel.

* * * * *